United States Patent [19]

Iverson et al.

[11] 4,423,336
[45] Dec. 27, 1983

[54] ELECTROMECHANICALLY CONTROLLED AUTOMATIC TRANSFER SWITCH AND BYPASS SWITCH ASSEMBLY

[75] Inventors: James R. Iverson, Fridley; Ernest L. Tell; Terry L. Pinotti, both of Mounds View, all of Minn.

[73] Assignee: McGraw-Edison Company, Rolling Meadows, Ill.

[21] Appl. No.: 378,642

[22] Filed: May 17, 1982

[51] Int. Cl.³ ............................................. H02J 7/00
[52] U.S. Cl. .................................................... 307/64
[58] Field of Search ................. 200/50 AA, 50 C, 18; 361/333–345; 307/64

[56] References Cited

U.S. PATENT DOCUMENTS

| | | | |
|---|---|---|---|
| 2,883,483 | 4/1959 | Horn | 200/50 AA |
| 3,283,089 | 11/1966 | Anderson et al. | 200/18 |
| 3,636,368 | 1/1972 | Sia | 307/64 |
| 3,697,709 | 10/1972 | Witkor | 200/48 R |
| 3,778,633 | 12/1973 | De Vissor et al. | 307/64 |
| 3,920,939 | 11/1975 | Ciboldi et al. | 200/50 AA |
| 3,936,782 | 2/1976 | Moakler et al. | 335/161 |
| 4,002,865 | 1/1977 | Kuhn et al. | 200/50 AA |
| 4,020,301 | 4/1977 | Ericson et al. | 200/50 AA |
| 4,139,748 | 2/1979 | Wolfe et al. | 200/50 AA |
| 4,157,461 | 1/1979 | Witkor | 200/18 |
| 4,206,329 | 6/1980 | Jarosz | 200/50 AA |
| 4,216,521 | 8/1980 | Merola | 361/345 |
| 4,231,029 | 10/1980 | Johnston | 307/64 X |
| 4,233,643 | 11/1980 | Iverson et al. | 361/344 |
| 4,270,031 | 5/1981 | Borona et al. | 200/50 C |

FOREIGN PATENT DOCUMENTS 1309202  3/1973  United Kingdom .

Primary Examiner—J. R. Scott
Attorney, Agent, or Firm—James A. Gabala; Jon C. Gealow; Jon F. Tuttle

[57] ABSTRACT

An electromechanically controlled switch assembly including an automatic, three position, removable, transfer switch and a three position, manually operated bypass switch assembly. Electromechanical controls are utilized to sense the position of both switches, including whether or not the bypass switch is being manually switched to the normal or an emergency source of power, whether or not the power sources are available, and whether or not the transfer switch is properly located within its supporting frame for normal operation, completely isolated, or isolated from the load but in the correct location for testing. In one embodiment the electromechanical controls interlock the operation of the switches and assure safety of operation of the assembly by switching the automatic transfer switch to an open or neutral position if it is being isolated, returned to normal, or if the operator is switching the bypass switch to connect the load to a source of power other than that to which the transfer switch is connecting the load.

23 Claims, 31 Drawing Figures

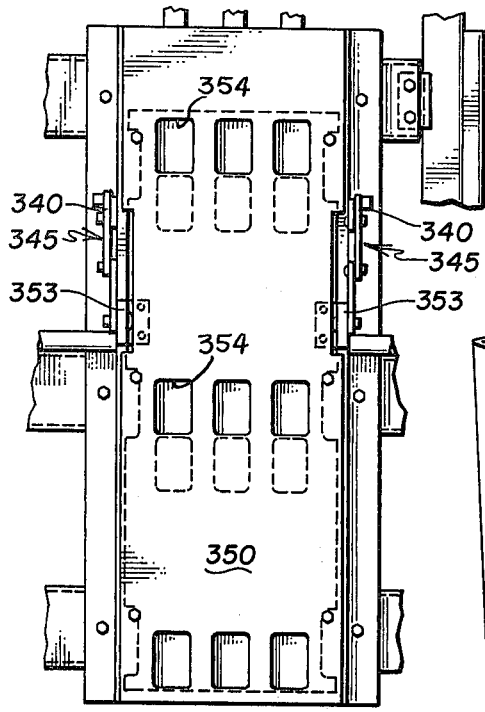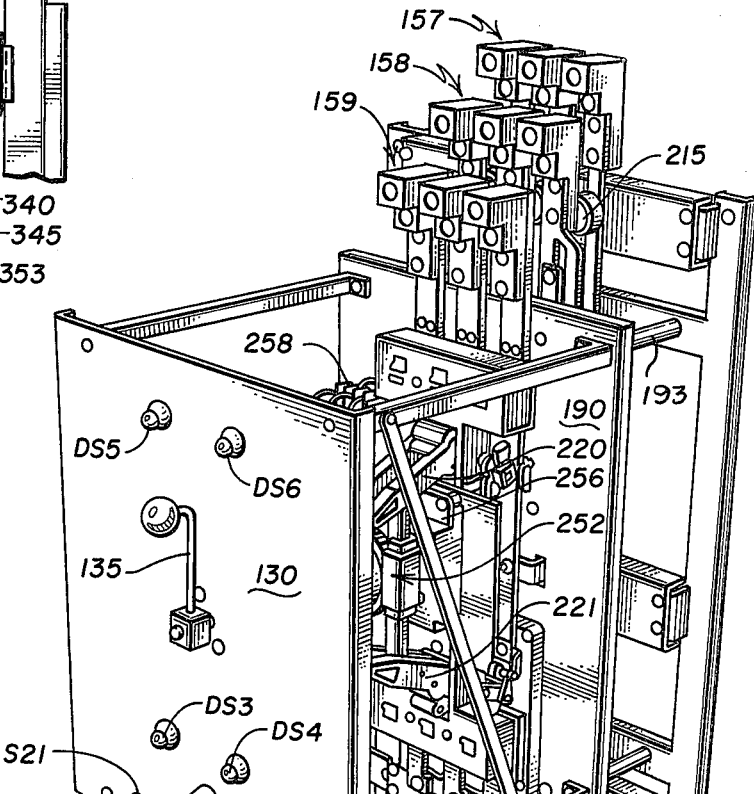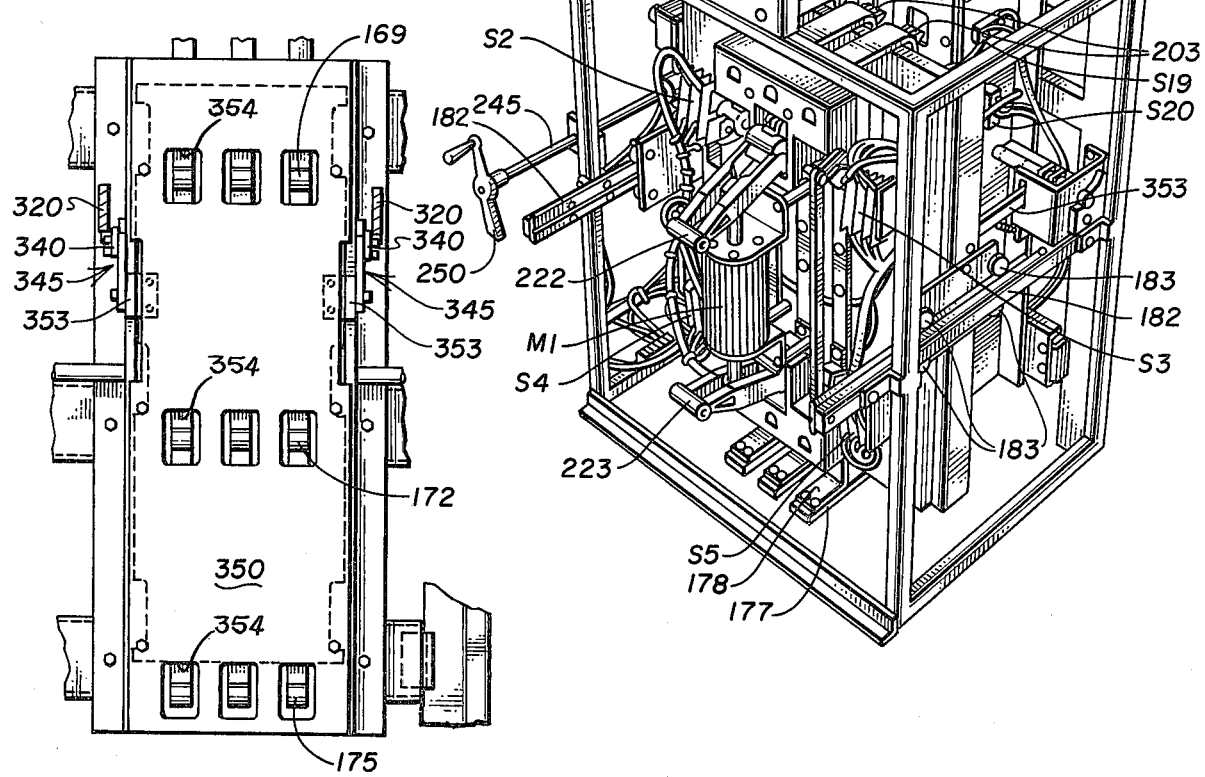

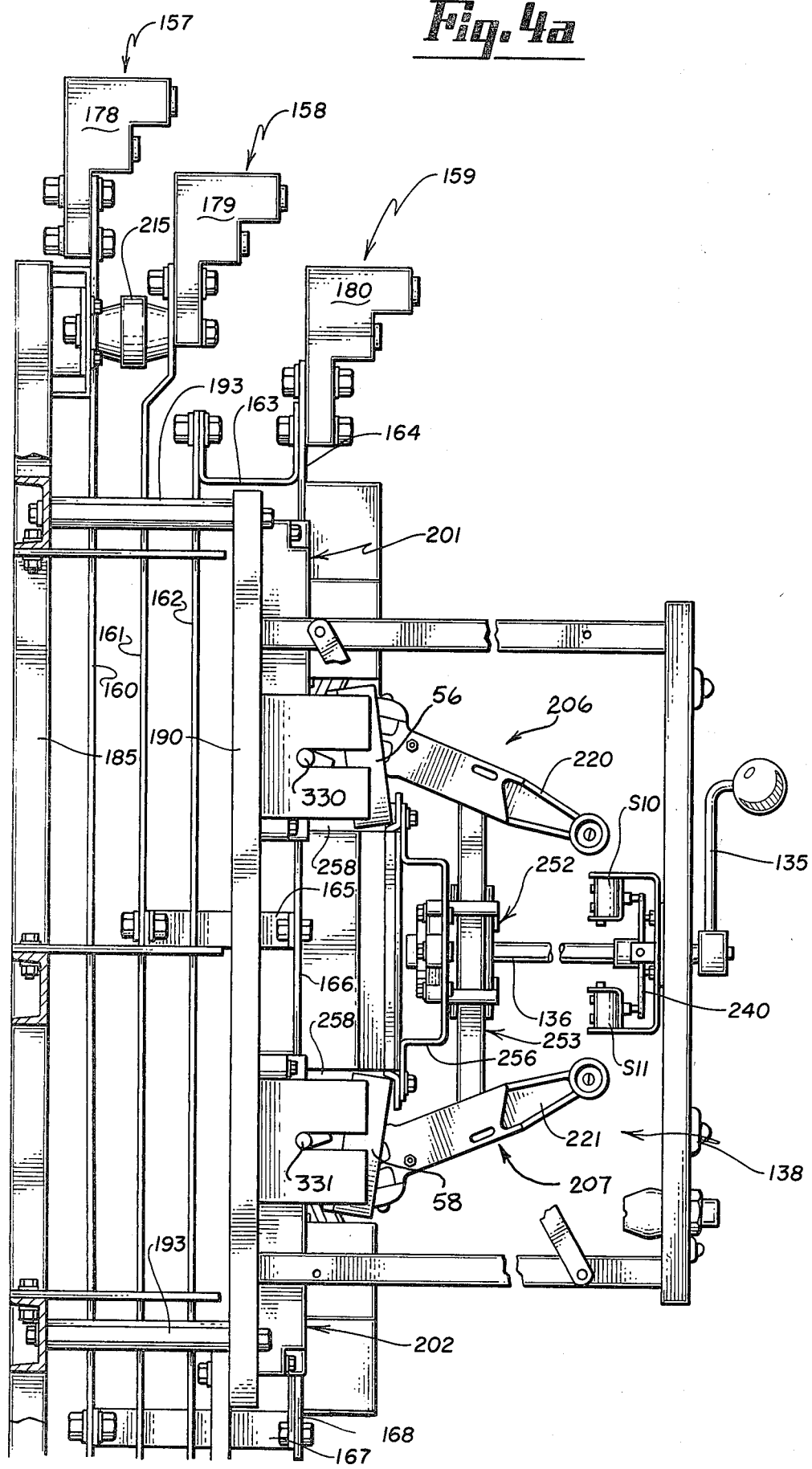

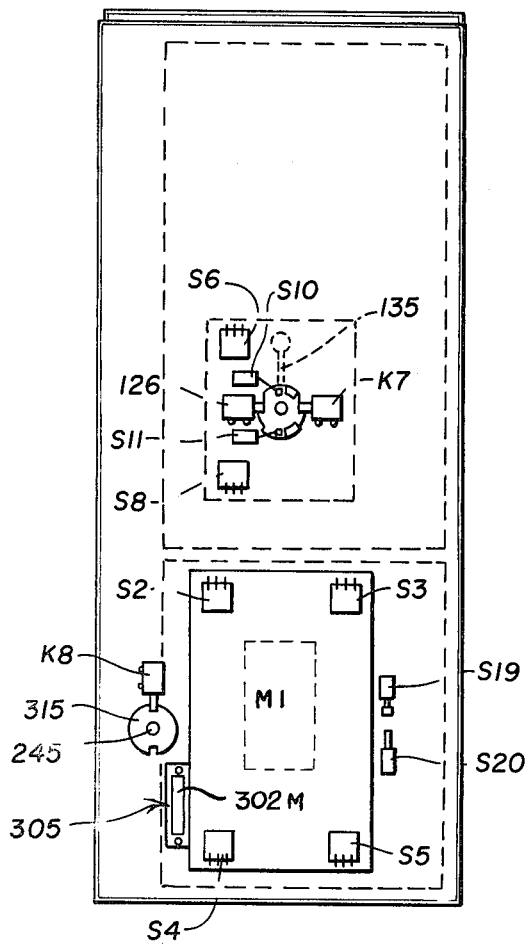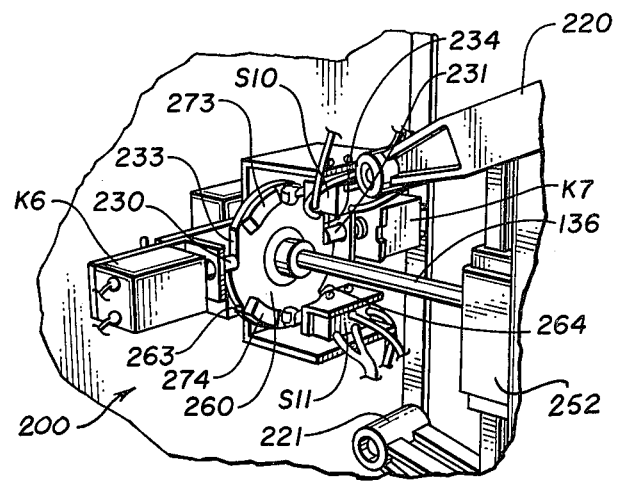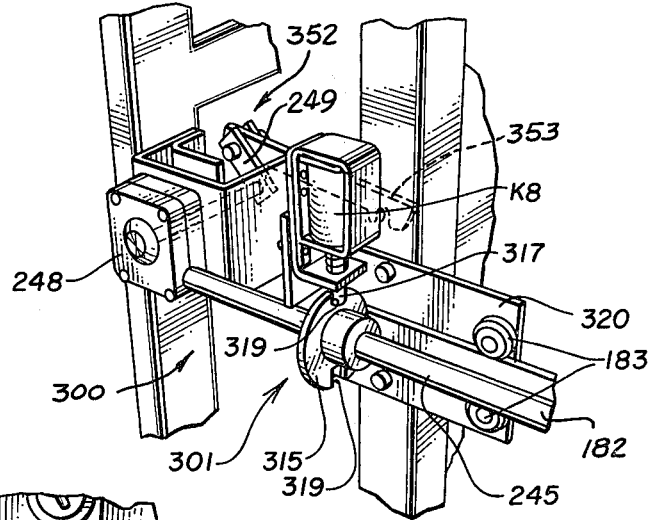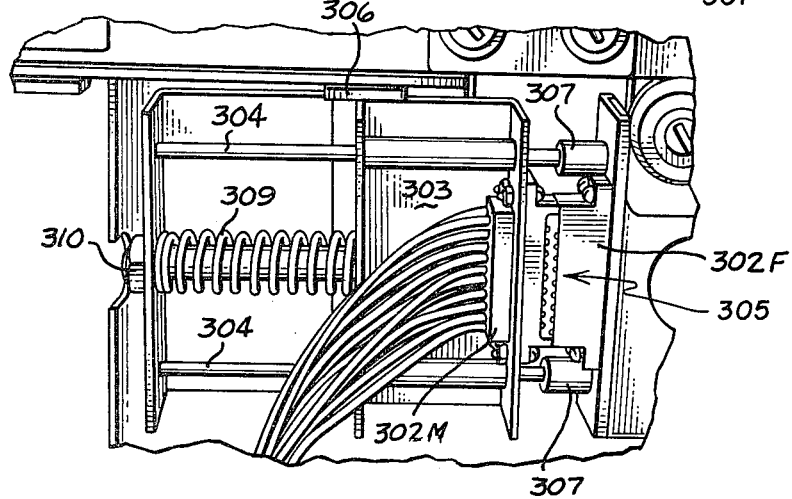

Fig.10a
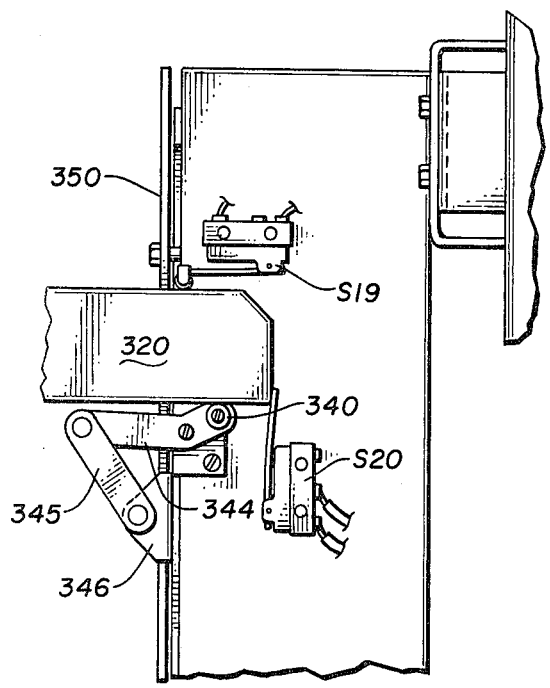
Fig.10b
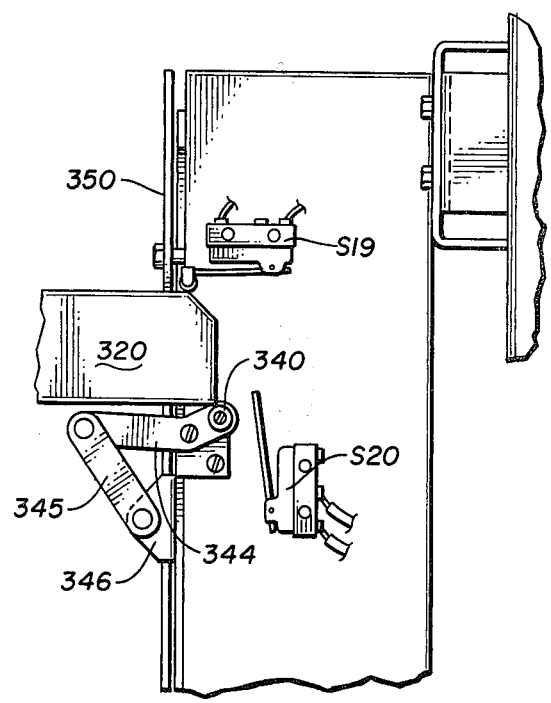
Fig.10c
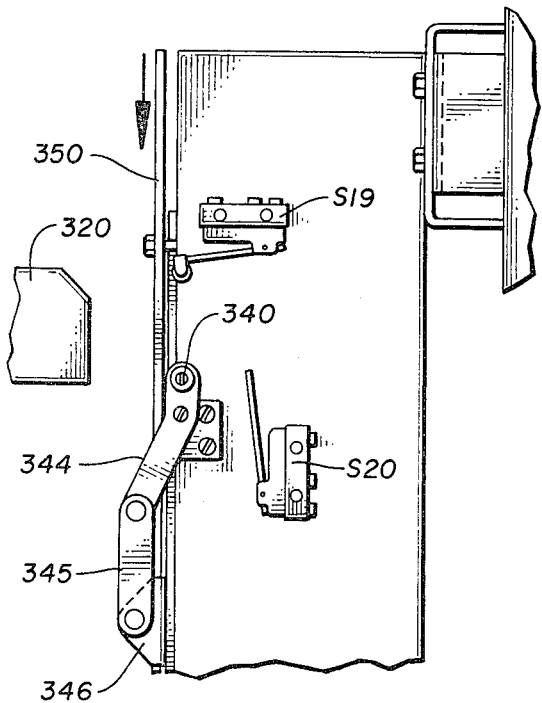
Fig.13
| Fig.13a | Fig.13b |
|---------|---------|
| Fig.13c | Fig.13d |
Fig.14
| Fig.14a | Fig.14b |
|---------|---------|
| Fig.14c | Fig.14d |
Fig.15
| Fig.15a | Fig.15b |
|---------|---------|
| Fig.15c | Fig.15d |
Fig.16
| Fig.16a | Fig.16b |
|---------|---------|
| Fig.16c | Fig.16d |

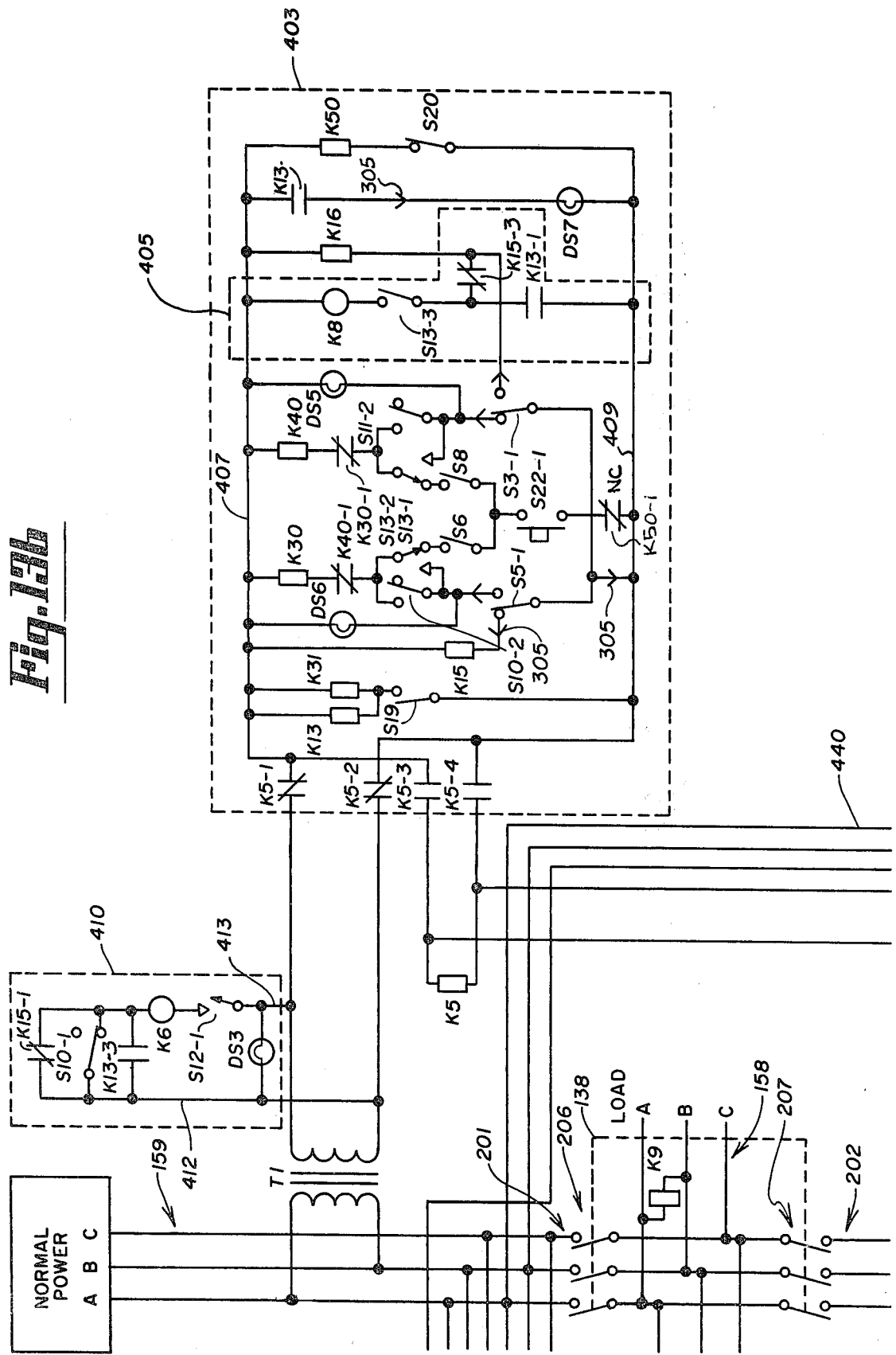

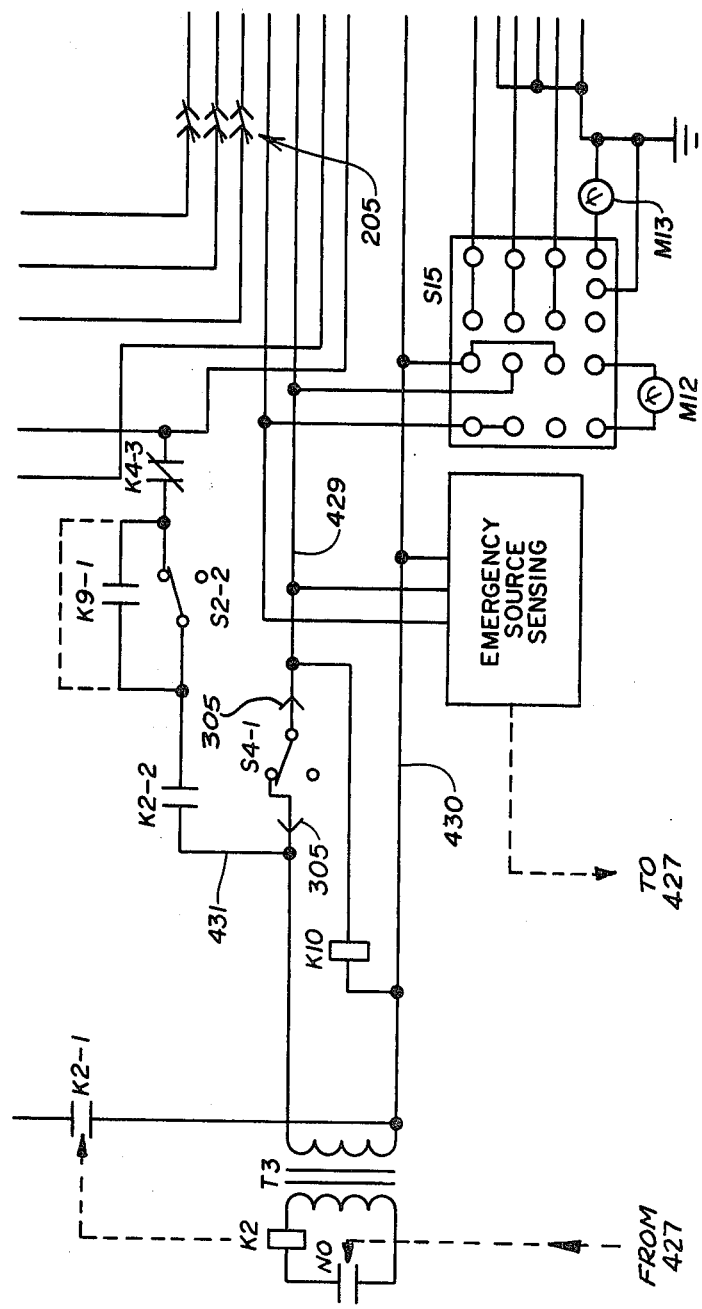

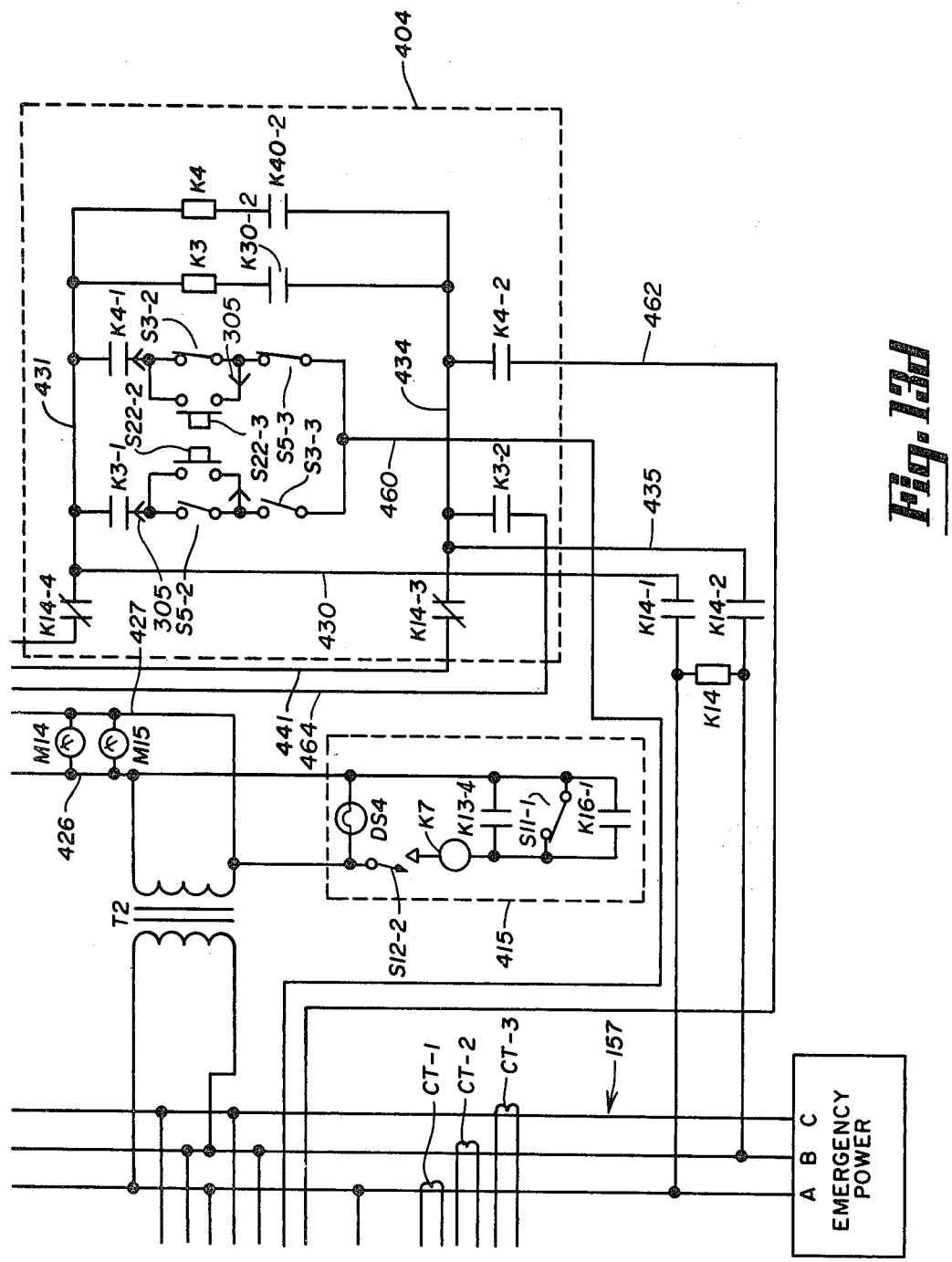

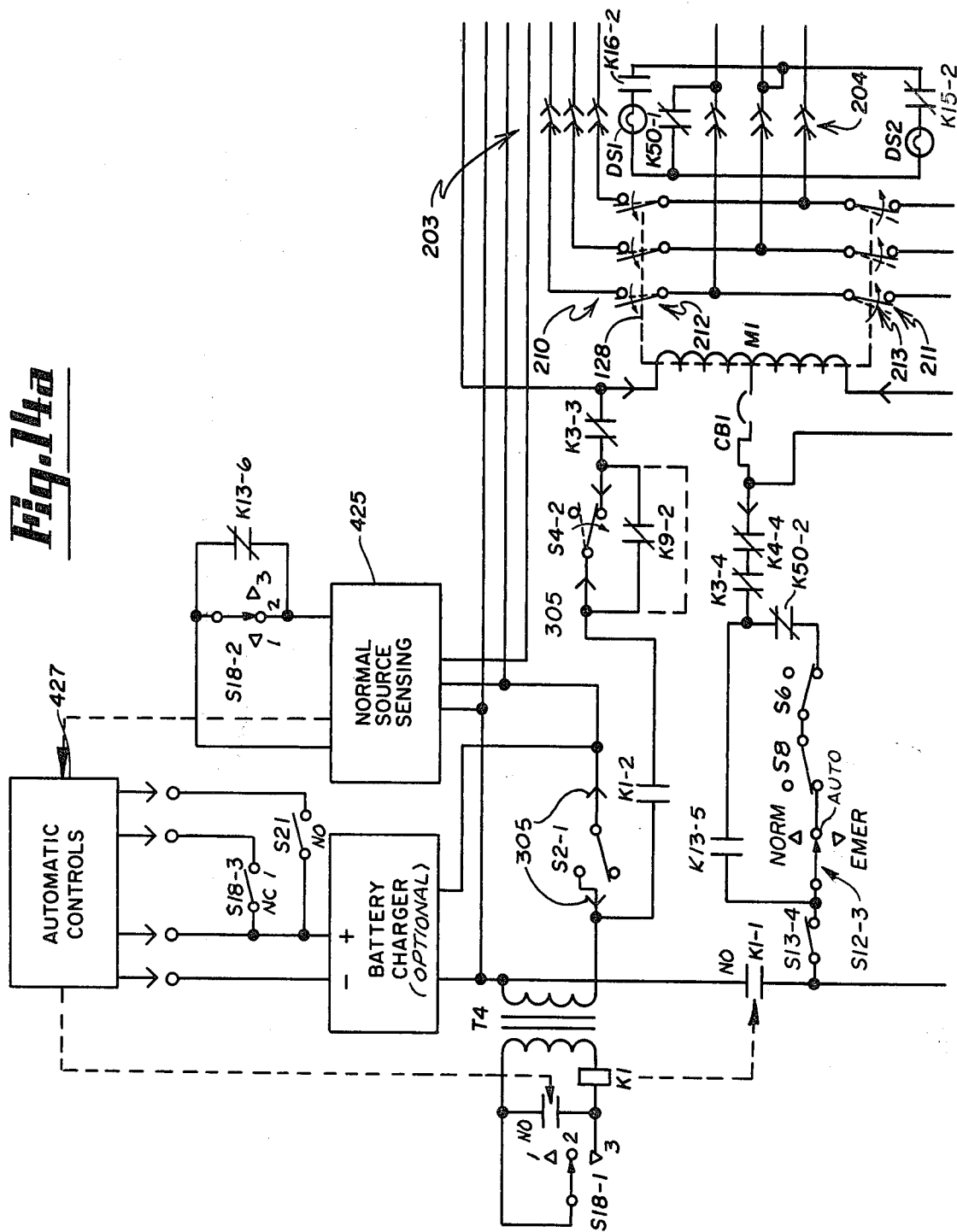

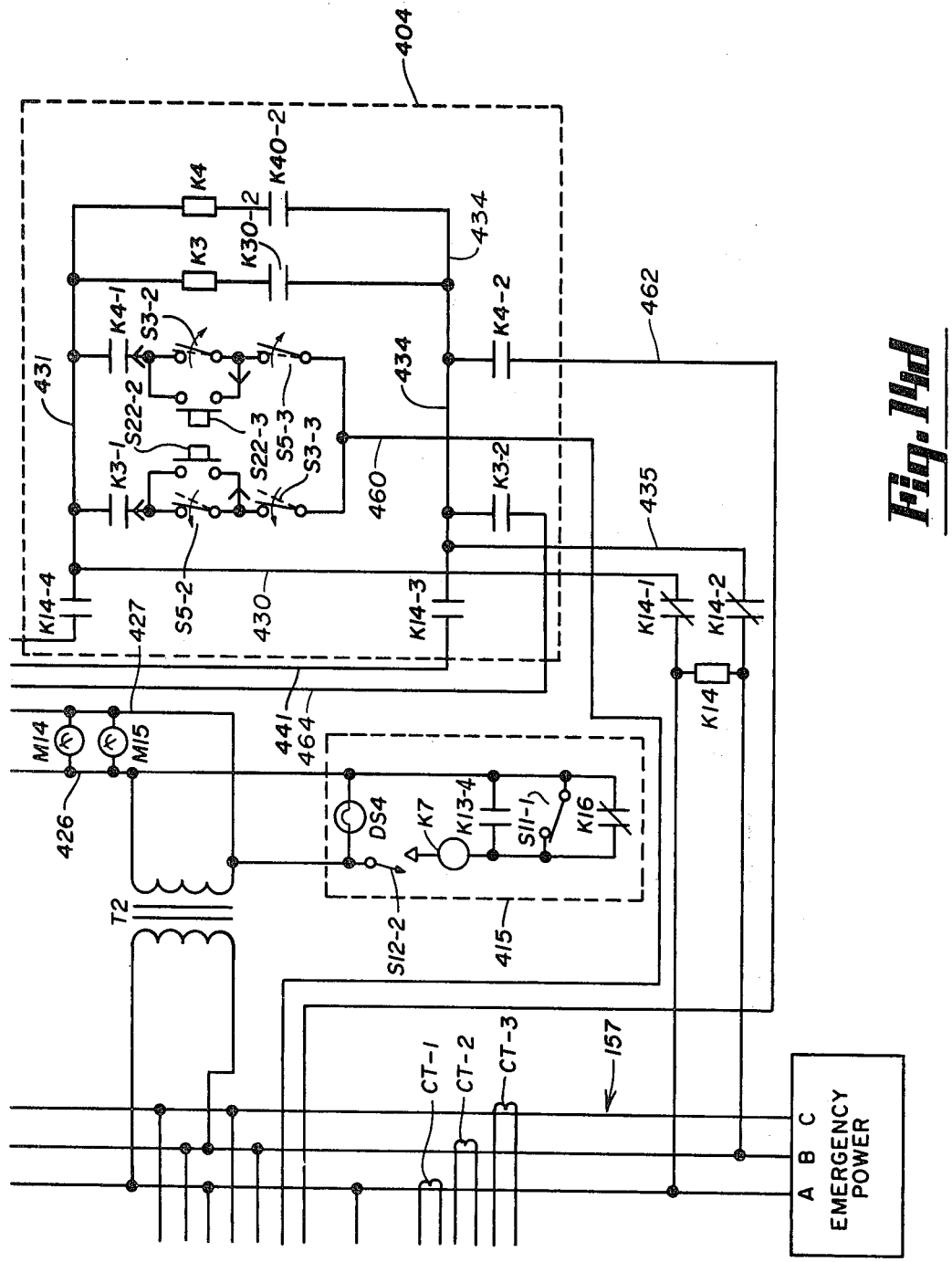

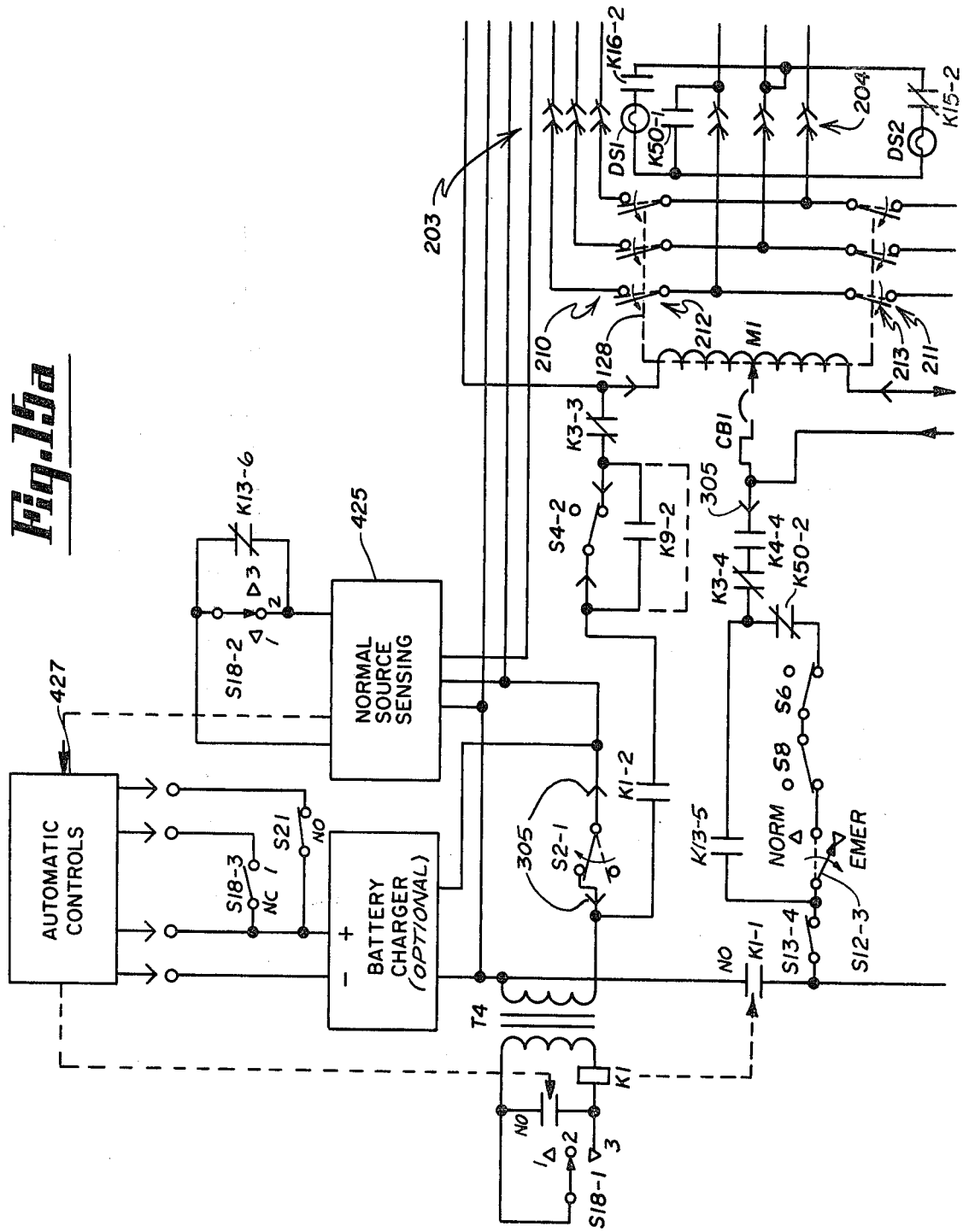

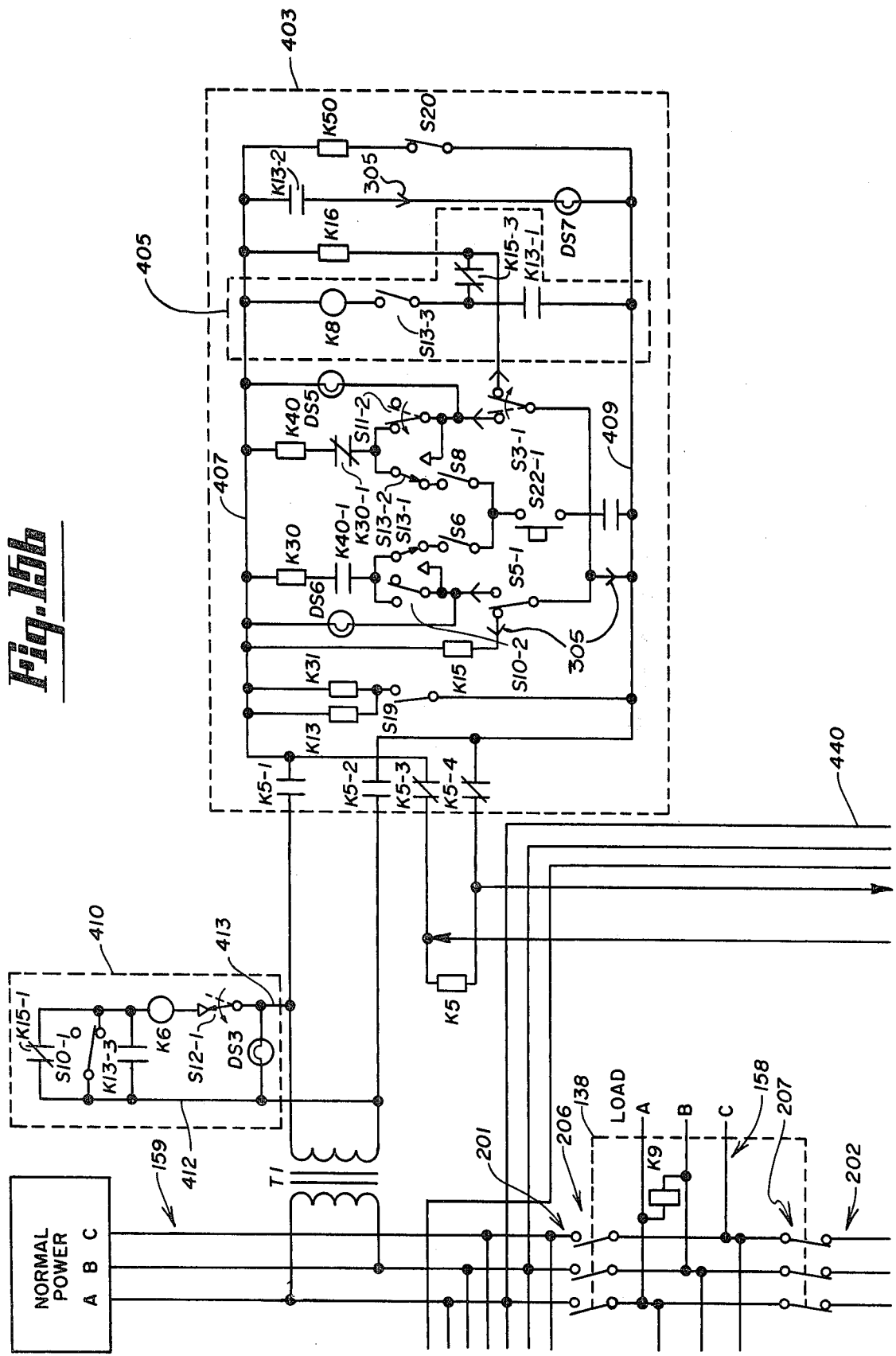

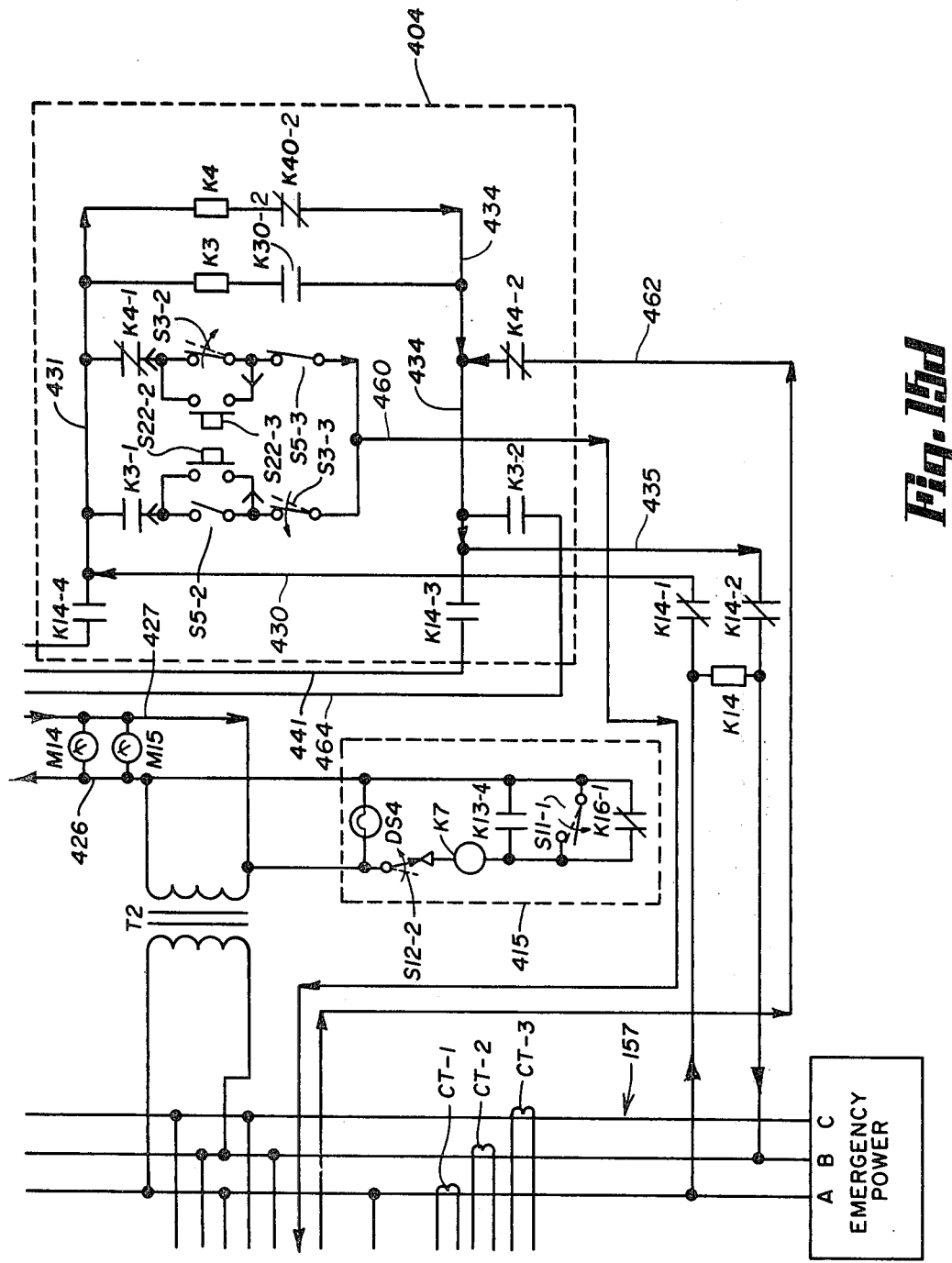

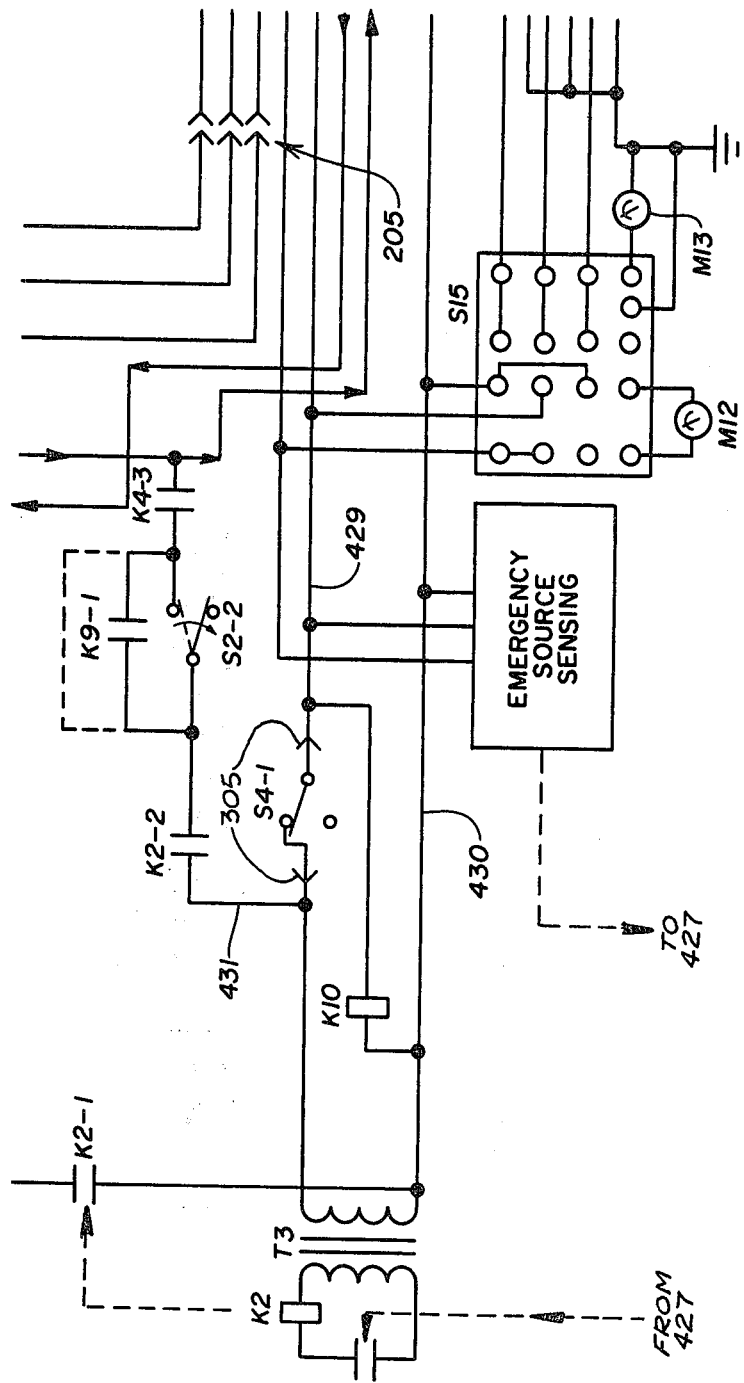

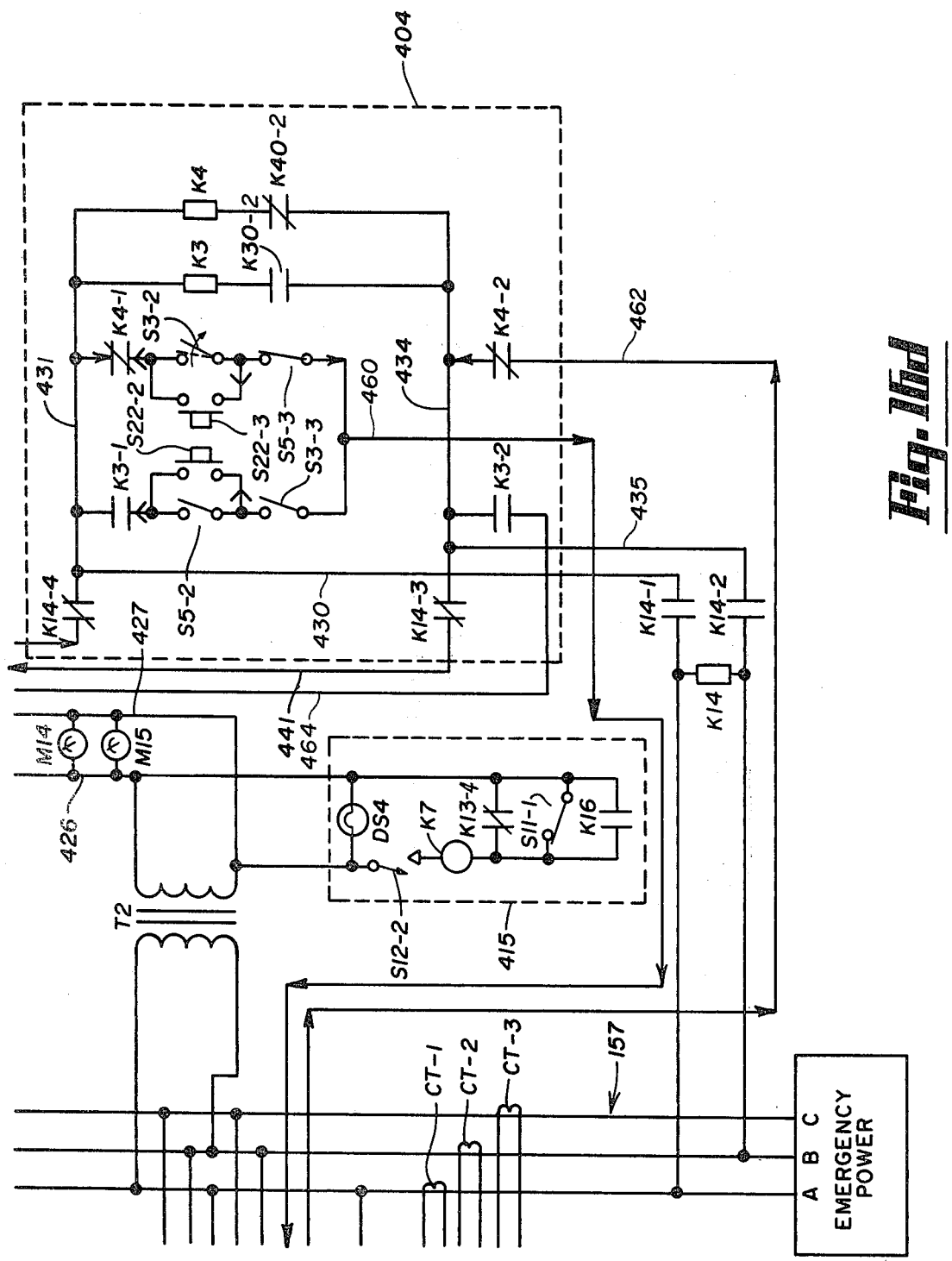

ELECTROMECHANICALLY CONTROLLED AUTOMATIC TRANSFER SWITCH AND BYPASS SWITCH ASSEMBLY

TECHNICAL FIELD

The invention relates to automatic transfer switches which normally connect available utility provided power to an electrical load, and which automatically switch the load to an alternative energy source, such as an emergency generator, when the normal source of power is lost or becomes unavailable.

BACKGROUND OF THE INVENTION

Automatic transfer switches must be periodically tested and maintained to be sure that they will operate automatically when needed. Automatic transfer switches have become especially important since more and more sectors of the economy are purchasing emergency generator sets (i.e., computer installations, hospitals, etc.). It is essential that the reliability of automatic transfer switches be demonstrated without difficulty. Heretofor the testing of automatic transfer switches has required the use of a bypass switch assembly to temporarily connect the electrical load to an available source of power, an isolating switch assembly to isolate the automatic transfer switch from the bypass switch, and a test load. In addition, cable interconnects and interlocks have been required to assure safety while testing. Designs for the automatic transfer switches are illustrated in U.S. Pat. Nos. 3,283,089; 3,778,633; and 3,936,782.

Attempts have been made to improve the state of the art. One such arrangement is shown and described in U.S. Pat. No. 3,697,709, wherein the bypass switch and isolation switch functions were combined.

Another attempt to improve the prior art (illustrated by U.S. Pat. No. 4,157,461) eliminated the necessity for a separate isolation switch or switches by using sliding contacts of varying lengths to perform the isolation function (i.e., a set of long contacts to maintain power to the transfer switch for testing and a set of short contact to disconnect or isolate the electrical load from the transfer switch) while the power source and load were connected together by the bypass switch. Mechanical means were provided to interlock the various elements (i.e., to prevent isolation of the load from the automatic transfer switch, if the bypass switch was open, and to prevent switching of the bypass switch to connect the load to a power source different than that to which the automatic transfer switch was connected). Other improvements are certainly in order considering the importance of these switches.

It would be particularly desirable to improve the manner in which the automatic transfer switch is tested. A simple fool-proof procedure and preferably a test scheme incorporating automatic interlocks would be welcomed by the industry. This is especially true since these switches are being used by many industries and service organizations which do not routinely maintain a staff of skilled electricians and test engineers.

SUMMARY OF THE INVENTION

In accordance with the subject invention, a unique combination of electromechanical elements is disclosed which cooperate together to perform the automatic transfer function and an improved means for bypassing, isolating, testing, removing and reinserting the automatic transfer switch.

In particular, automatic electromechanical controls are provided to isolate the automatic transfer switch at any time regardless of the initial position of the bypass switch and to allow the bypass switch to be switched regardless of the initial position of the automatic transfer switch. Switching of the bypass switch to an available source of power is possible at any time since the electromechanical controls operate to move the automatic transfer switch to a neutral or open position to prevent improper interconnection of the power sources (i.e., two sources of power connected to the load at the same time.) Similarly, isolation, removal, and reinsertion of the automatic transfer switch is independent of the position of the bypass switch. In each case, the automatic electromechanical controls operate to sense the operating condition of both switches, to correctly position the automatic transfer switch for removal or insertion, and to prevent interconnection of the two power sources (i.e., by connection of the load to both power sources simultaneously).

In the embodiment illustrated proper operating conditions are maintained by two unique electromechanical control assemblies:

a bypass switch interlock assembly, which prevents switching of the bypass switch to a dead source and controls the operation of the bypass switch and the automatic transfer switch when a bypass is made to a power source other than that to which the transfer switch is connected; and an isolation interlock assembly, associated soley with the automatic transfer switch, which permits the automatic transfer switch to be disconnected or connected to the load at any time, but only after the transfer switch has been automatically switched to its neutral or open position.

In one specific embodiment an automatic transfer switch and bypass switch assembly is provided in the form of an integrated compact system which is comprised of the following set of interactive elements:

a support frame for carrying the two switches and the associated controls;

a three position manually operated bypass switch with normal source contacts, emergency source contacts, and load connections;

a plurality of sensing means, comprising limit switches, associated with the normal source contacts and the emergency source contacts of the bypass switch;

a manually withdrawable, electrically actuated, three position automatic transfer switch with normal source contacts, emergency source contacts, and load connections;

a plurality of sensing means, comprising limit switches, associated with the normal source contacts and the emergency source contacts of the automatic transfer switch;

a set of normal, emergency and load busbars for interconnecting the bypass and automatic transfer switches with both sources of power and the load;

a set of isolating contacts of the sliding contact, separable element, non-load interrupting type for interconnecting the automatic transfer switch with the power sources and the load;

controls for sensing power source conditions, causing the automatic transfer switch to be switched to the preferred power source and controlling an associated emergency source of power;

a plurality of integrally incorporated test connections to permit operation and testing of transfer switch while the bypass switch connects power to the load;

manual controls to allow testing of the automatic controls, the transfer switch and the emergency source of power;

location sensing means, associated with the automatic transfer switch, to determine whether it is fully inserted, in a test position, or isolated relative to the switch assembly support frame;

a bypass switch interlock assembly to prevent the bypass switch from being switched to a dead source and to control the operation of the automatic transfer switch so that the bypass switch cannot be switched to a source opposite to that that the automatic transfer switch is switched;

an isolation interlock assembly to control the operation of the automatic transfer switch so that it is switched to the neutral or open position during isolation and reinsertion within the frame;

an enclosure to house the automatic transfer switch, the bypass switch, and the support frame to mount the associated key switches and push button controls, indicating lights and meters used to display various system operating conditions;

a safety shutter assembly which shields the power source contacts when the automatic transfer switch is removed or withdrawn from the switch enclosure; and means for removing the transfer switch, including a drawout assembly, for testing or repair.

The advantages and features of the present invention will become readily apparent from the following detailed description of the invention and the embodiments illustrated in the drawings, and from the claims wherein the novel combination of elements forming the invention will be found to produce a highly beneficial and somewhat substantial improvement over the prior art.

DESCRIPTION OF THE DRAWINGS

FIG. 2 is a perspective view of the automatic transfer switch and bypass switch assembly from the right hand side of FIG. 1 with the enclosure removed;

FIG. 5 is a front elevational schematic drawing showing the preferred locations of the interlock assemblies, interlock solenoids and the sensing means which sense the position and condition of the automatic transfer switch and the bypass switch assembly;

FIG. 7 is a pictorial perspective view of the bypass switch interlock assembly;

FIG. 8 is a pictorial perspective view of the isolation interlock assembly;

FIG. 9 is a pictorial perspective view of the secondary interconnect mechanism in the test position;

FIG. 10, comprising FIGS. 10a–10c, are side views of the automatic transfer switch shutter support arms with the automatic transfer switch fully inserted, FIG. 10a partially withdrawn (FIG. 10b) to the test position, and fully isolated (FIG. 10c) showing the sensing means for determining the isolation status of the transfer switch and the control means for the shutter assembly;

FIG. 11 is a front elevational view of that portion of the enclosure which houses the automatic transfer switch (with the automatic transfer switch removed for purposes of clarity) showing the condition of the shutter assembly when the automatic transfer switch is in place and operational as represented in FIG. 10a;

FIG. 12 is a front elevational view of that portion of the enclosure which houses the automatic transfer switch (with the automatic transfer switch removed) showing the condition of the shutter assembly when the automatic transfer switch is removed from the enclosure as represented in FIG. 10c;

FIG. 13, comprising FIGS. 13a, 13b, 13c and 13d, is a schematic diagram of the sensing and control means when the automatic transfer switch is supplying normal power to the load;

FIG. 14, comprising FIGS. 14a, 14b, 14c and 14d, is the schematic diagram of FIG. 13 showing the configuration of the electromechanical controls when the normal source fails and the automatic transfer switch is switched to supply emergency power to the load;

FIG. 15, comprising FIGS. 15a, 15b, 15c and 15d, is the schematic diagram of FIG. 13 showing how a manual bypass can be made to supply emergency power to the load when the transfer switch is initially connecting the load to the normal source of power; and FIG. 16, comprising FIGS. 16a, 16b, 16c and 16d, is the schematic diagram of FIG. 13 showing how the transfer switch can be isolated for testing or repair when initially supplying normal power to the load.

DESCRIPTION OF THE PREFERRED EMBODIMENT

Figure 1:
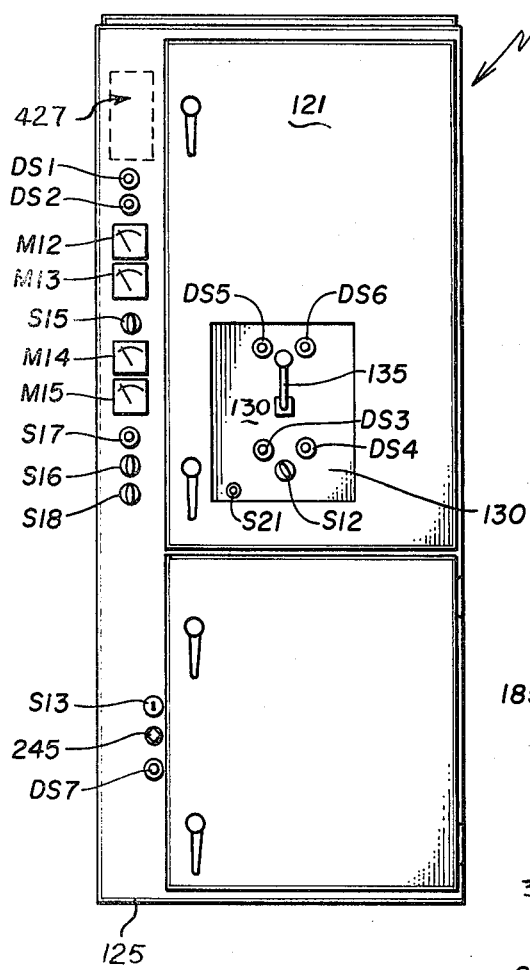
FIG. 1 is a front elevational view of an enclosure for the automatic transfer switch and bypass switch assembly showing user operable elements and display means.

While this invention is succeptable of embodiment in many different forms, there is shown in the drawings and will herein be described in detail one specific embodiment with the understanding that the present disclosure is to be considered an exemplification of the principles of the invention an is not intended to limit the invention to the specificate embodiments illustrated.

Before describing the specificate details of the invention an overall description of the preferred embodiment will be given so that the unique manner in which the invention functions will be better appreciated.

Turning to the drawings, FIG. 1 shows an enclosure 125 for the automatic transfer switch and bypass switch assembly 120 that is the subject of the present invention. The switch assembly 120 includes an automatic transfer switch 128, a bypass switch 138, and a frame 185 for supporting the switches. The enclosure 125 is constructed of sheet steel to form three basic compartments or sections. Its function is to house the switching devices or switches, the associated power cables and buses and to mount the control and indicating elements used to operate the switching devices. It should be understood by those skilled in the art that while a preferred structure for an automatic transfer switch and bypass switch assembly 120 is shown and described in the drawings, the use of electromechanical sensing and control means in the manner disclosed to sense the operating condition of the switches and to automatically control the operation of the transfer switch is readily capable of being used, with minimal modification, with any standard automatic transfer switch and a conventional three position switch used to perform the function of a bypass switch.

As shown in FIG. 1 (and also shown in FIGS. 13 through 16) a number of "status devices" are provided to the operator of switch assembly 120 for the purpose of indicating the operating status of the switch assembly and the associated emergency or alternate power supply. Specifically, a plurality of display means and control elements DS1, DS2, M12, M13, M14, M15 and S15 through S18 are provided along the left hand side of the switch enclosure 125. These include: a first status light DS1 which is energized when the normal power source is supplying the load through the automatic transfer switch 128; a second status light DS2 which is energized when the emergency power source is supplying the load through the transfer switch 128; a voltmeter M12 and ammeter M13 to monitor voltage and load current from the emergency power source; a phase selector switch S15 for use with the ammeter M13 and voltmeter M12; a frequency meter M14 and a running time meter M15 to further monitor the frequency and the operation of the emergency power source (i.e., diesel engine/generator set running time); a handcrank-auto-stop switch S16; an overcrank reset switch S17; a transfer-auto-test switch S18 provided to test the automatic transfer switch 128 and to exercise the switch when it is in the test position and the bypass switch 138 is supplying power to the load. Other controls may be provided to operate the associated diesel engine/generator set.

The bypass switch 138 is operated from a control panel 130 that protrudes through the upper door or cover 121 of the enclosure 125. This panel is provided with a bypass switch operating handle or lever 135 which is used to switch or operate the bypass switch 138. The bypass switch 138 is used to "electrically bypass" the automatic transfer switch 128 when the automatic transfer switch is isolated for testing or repair. In normal operation, the bypass switch 138 is connected to neither source of power and all power connections to the load are provided through the automatic transfer switch 128.

Two status lights DS5 and DS6 are mounted above the bypass switch operating handle 135 to indicate the position of the automatic transfer switch 128. One light DS5 indicates that the transfer switch 128 is in its normal position; the other light DS6 indicates that the automatic transfer switch is in its emergency position. Two status lights DS4 and DS3 are mounted below the operating handle 135 to indicate which of the two sources of power are available (i.e., the emergency power source and/or the normal power source).

Below the available source indicating lights DS3 and DS4 are two switches S12 and S21. One switch S21, a push button switch, is used to manually start the associated diesel engine/generator set to provide emergency power. The other switch S12 forms part of the bypass switch interlock assembly (shown in FIG. 7 and and diagramed in FIG. 15) which must be operated when switching the bypass switch 138 to either source of power. The specific function and operation of this switch S12 will be discussed in more detail below in connection with the schematic diagram of the electromechanical controls of the invention (FIGS. 13, 14, 15 and 16).

Figure 3:
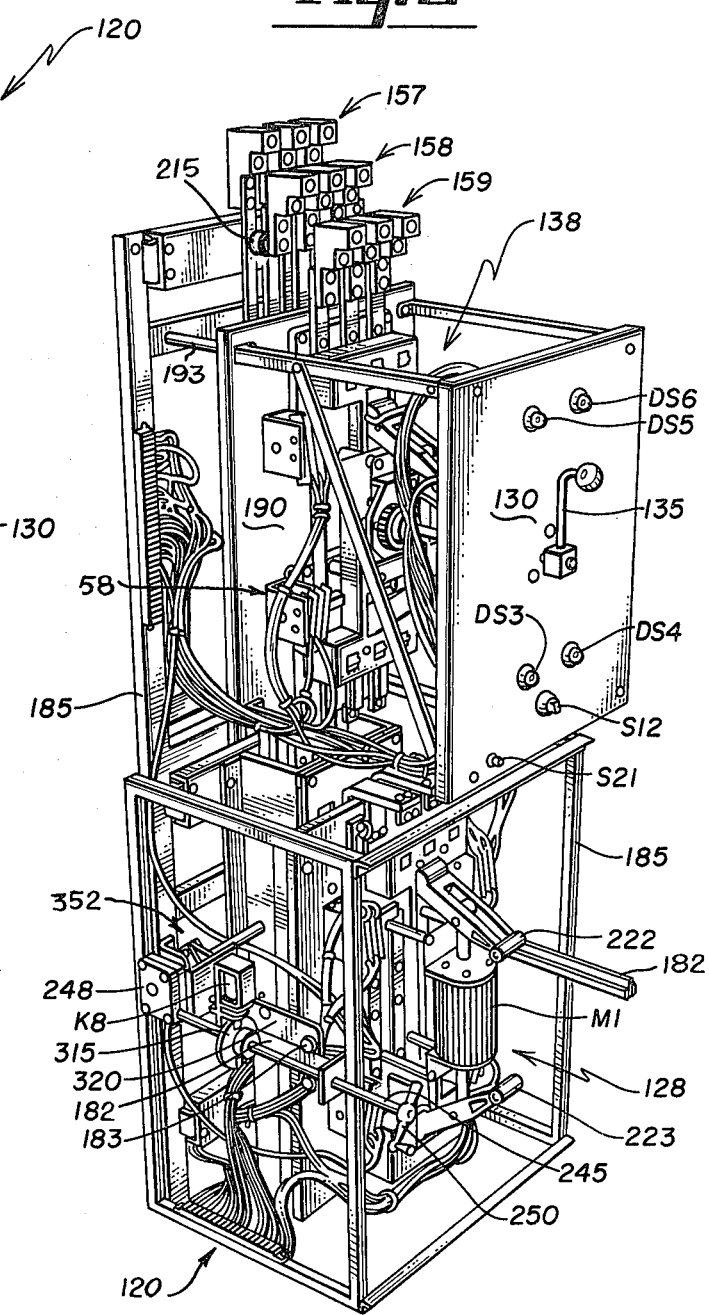
FIG. 3 is a perspective view from left hand side of FIG. 2.
Figure 4B:
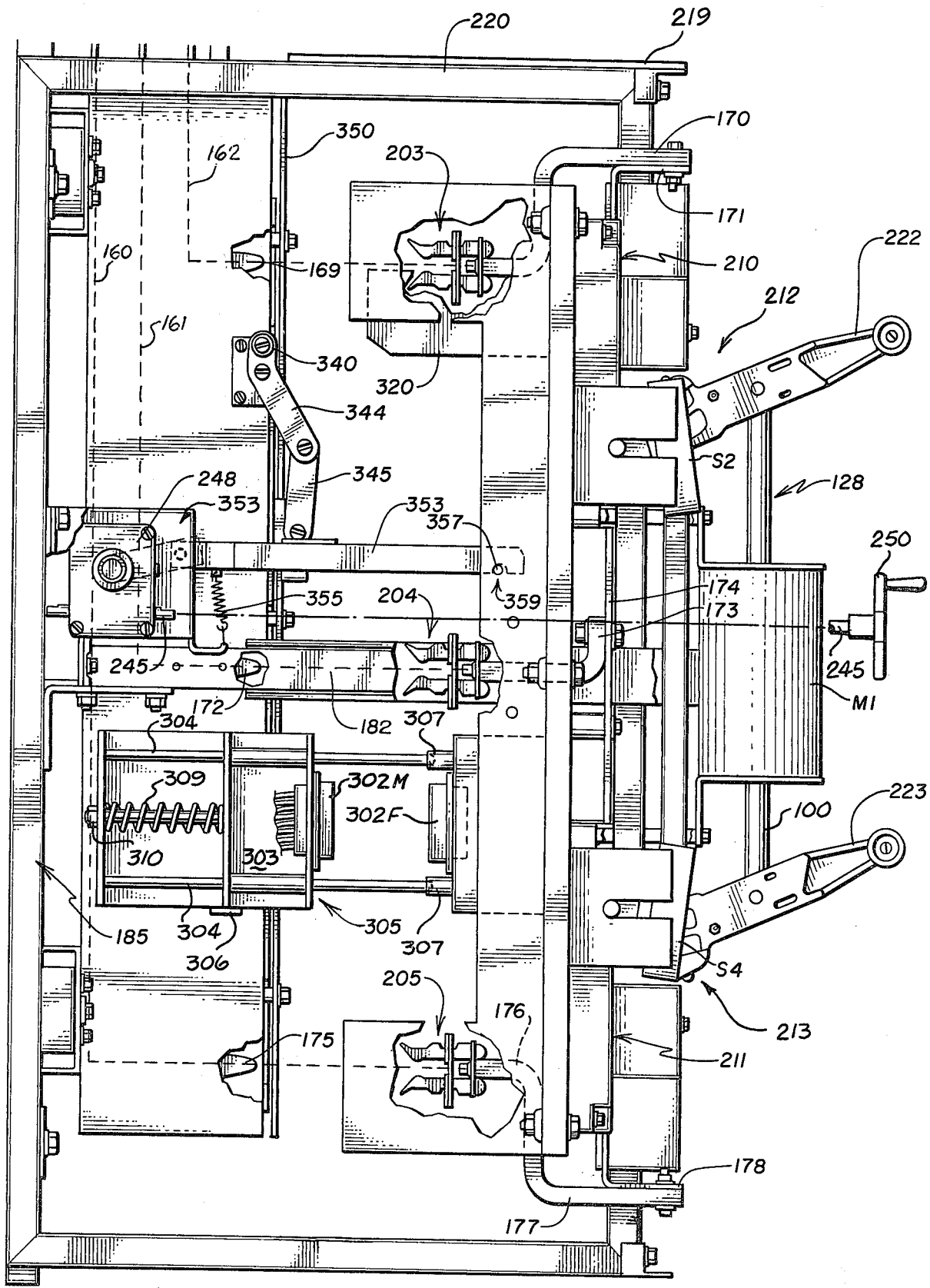
FIG. 4, comprising FIGS. 4a (upper half) and 4b, (lower half) is a right hand elevational view of the switch assembly with the transfer switch isolated showing the power connections between the automatic transfer switch and the bypass switch and some of the other electromechanical elements of the invention.

The automatic transfer switch 128 is housed under the bypass switch 138 (See FIGS. 2, 3, and 4). Preferably, an insulated barrier 219 (See FIG. 4b; removed from FIGS. 2 and 3 for purposes of illustration) separates the two switches. A key switch S13 (See FIG. 1) is mounted on the face of the enclosure 125. It is used, in conjunction with an isolation mechanism shaft 245 (See FIG. 3), to isolate and remove the automatic transfer switch 128 for testing or repair. The exposed end of the shaft 245 is adapted to receive a hand crank 250. The manner in which the automatic transfer switch 128 is isolated and removed will be discussed below. Conventional automatic controls 427 (See FIG. 14a) may be mounted at a convenient location on the inside of the upper door 121 or the left hand side of enclosure 125. A modern control is exemplified by Onan Corporation's POWER SENTRY ELECTRONIC CONTROL. In particular, this control includes an adjustable under voltage sensor which simultaneously monitors all phases of both normal and emergency power sources; an adjustable range solid-state dropout time delay circuit which can be field adjusted for brownout conditions to protect sensitive equipment or adjusted to protect conventional equipment against gross voltage variations; contacts for energizing the emergency generator and its accessories; control mode status indicators; a plurality of adjustable solid-state time delay circuits including a starting delay to prevent nuisance generator set starts in the event of a momentary power system variation or loss, a transfer delay to stabilize the generator set before the application of the load so as to prevent needless power interruption if the normal source variation or loss is only momentary, a retransfer delay to prevent needless power interruption if the return of the normal power source is only momentary, and a stop delay to maintain the availability of the generator set for immediate reconnection in the event that the normal power source fails shortly retransfer (this also allows gradual cool-down of the generator set by running it unloaded); an exerciser clock to set day, time, and duration of the generator set exercise (including a with/without load selector switch); a battery trickle charger set to maintain generator set starting battery ready for operation; and an optional program transition control to extend the transition or disconnect period beyond the normal six-cycle time to allow residual voltages generated by heavy inductive loads to decay to a safe level. Finally, a status light DS7 is provided to indicate when the automatic transfer switch 128 has been positioned to its "test" position.

FIGS. 2, 3 and 4 show in greater detail the operating mechanism for the switch assembly 120. In FIG. 4, both switches are shown switched to the normal operating configuration with the bypass switch 138 switched to the automatic mode (that is, connecting neither source of power to the load, and with the automatic transfer switch 128 switched to the normal power source which would supply the load if it were available). However, for purposes of explanations (and to better illustrate the invention) the automatic transfer switch 138 is shown "isolated" in FIG. 4.

A plurality of lugged busbars or power buses 157, 158 and 159 are used to connect three phase power from the energy sources to the load through the automatic transfer switch 128 or the bypass switch 138. These connections are also shown in FIGS. 2 and 3 and schematically in FIGS. 13 through 16. The busbars 157, 158 and 159 are supported on frame 185 by insulators 215. Busbars 160, 161 and 162 for one phase of the two power supplies and the load are mounted at the rear of the support frame 185 (it should be understood that the busbars for the other two phases lie symmetrically behind the three busbars 160, 161 and 162 shown in FIG. 4).

As shown in FIGS. 2, 3 and 4, the automatic transfer switch 128 is suspended within the frame 185 by a set of wheels 183 (four on each side) which ride on a set of parallel rails 182 for easy removal. The rails 182 are securely supported by the frame 185 of the switch assembly 120.

The bypass switch 138 is mounted on an insulated base 190 (See FIG. 4a). The base is mounted on the frame 185 of the switch enclosure 125 by steel standoffs 193. Also mounted on the frame 185 are the busbars 160, 161, and 162 to connect both sources of power to the two switches 128 and 138, and to connect one of sources of power through one of the switches to the load.

As shown in FIG. 4, normal power (from lug 180) is supplied to the normal power stationary contact blocks 201 on the bypass switch 138 by busbars 164. Normal power is also connected (along normal power busbars 162 through buswork extensions 169) to a set isolating contacts 203 which are connected (by buses 170 and 171) to the normal power stationary contact blocks 210 on the automatic transfer switch 128.

Similarly, the emergency or alternate power source is supplied (from lug 178) to the emergency power stationary contact blocks 202 on the bypass switch 138 by busbar 167 and (from busbars 160 through buswork extensions 175, through isolating contacts 205 and buses 176, 177, and 178) to the emergency power stationary contact blocks 211 associated with the automatic transfer switch 128.

The load (via lug 179) is connected to the bypass switch stationary contact blocks by busbars 161, 165 and 166. The load bus 158 is interconnected to the automatic transfer switch 128 (by busbars 161, buswork extensions 172, and buses 173 and 174 through isolating contacts 204) in a similar manner. Insulators 215 (See FIG. 4a) may be conventionally provided between the various buses as needed.

Switch operating handles 220, 221, 222, and 223 are also provided. Two operating handles 220 and 221, and 222 and 223 are associated with each switch 138 and 128. All are operated in a manner to be discussed below and are not readily accessable to an operator of the switch assembly 120 when housed within the enclosure 125. The movable contacts 206, 207 and 212, 213 (See FIG. 6) associated with the handles are spring loaded and toggled over-center so that appropriate electrical contact may be made with the stationary contact blocks 201 and 202, and 210 and 211 depending upon which switch 128 or 138 is operated and which source of power is supplied to the load.

The configuration of the automatic transfer switch 128 as shown in FIGS. 2 and 3, is the "normal" configuration (i.e., with the automatic transfer switch engaged with both operating handles 222 and 223 up) so as to connect the normal source of power to the load.

The position of the automatic transfer switch 128 is controlled by an actuator motor M1 electrically connected to automatic electromechanical controls shown schematically in FIGS. 13 through 16. The actuator motor M1 operates an actuator rod 100 pivotably connected to both handles 222 and 223 to position the handles to either the normal source of power or to the emergency source of power or to disconnect the switch 128 from both sources and leave it in a "neutral" position. When the automatic transfer switch 128 is in "normal", the normal actuator handle 222 is shut and the emergency actuator handle 223 is open.

As shown in FIG. 3, the isolating mechanism shaft 245 is connected to a gear box 248 to move the automatic transfer switch 128 within the frame 185. The isolating shaft 245 is locked in position and cannot be turned manually to move the automatic transfer switch 128 along the rails 182 until the automatic transfer switch is in a disengaged or neutral position as will be discussed below. As previously described, a hand crank 250 is used to rotate the shaft 245. It is mounted on the isolation shaft 245 for testing or removal of the automatic transfer switch 128.

To operate the bypass switch operating handle 135 a number of operating steps are necessary to overcome the bypass switch interlock assembly (shown in FIG. 7 and discussed below). When these operating steps have been taken, the bypass switch operating handle 135 may be rotated to move the bypass switch to either the normal source of power or the emergency source of power. As illustrated in the drawings, a set of rack and pinion gears 252 and 253 (See FIG. 4a) are operatively connected to a shaft 136 driven by the bypass switch operating handle 135 and to both operating handles 220 and 221 (Also see FIG. 7). As best illustrated in FIGS. 2 and 4, the rack and pinion gears 252 and 253 are mounted on a rack support 256 which is mounted on the insulated bypass switch base 190 by a set of phenolic standoffs 258.

Now that the principle mechanical components of the invention have been identified, the unique electromechanical control system encompassed by the present invention will be described in detail. Turning to FIG. 7, the novel bypass switch operating mechanism will be explained in further detail. The bypass switch operating mechanism consists of:

the bypass source selector switch S12 (See FIGS. 2 and 3);

the bypass switch operating handle 135 (See FIGS. 2 and 3);

the bypass mechanism shaft 136;

the bypass switch interlock assembly 200;

the rack and pinion gear assemblies 252 and 253 (which are operatively connected to the bypass switch actuator handles 220 and 221); and the associated electromechanical devices (which are operationally discussed in connection with FIG. 15 and explained in the succeeding paragraphs).

The bypass switch operating mechanism is used to manually operate the bypass switch 138 and to interlock the operation of the automatic transfer switch 128 and bypass switch 138 to prevent undesirable operating conditions. The mechanism incorporates three operating positions of the bypass switch operating handle 135:

a "normal" position whereby the load is connected to the normal source of power;

an "emergency" position whereby the load is switched to the emergency source of power; and an "automatic" position whereby the bypass switch 138 is "open" (and does not connect either source of power to the load) and the automatic transfer switch 128 is used to supply the load. As shown in the drawings the bypass switch operating handle 135 is in the "automatic" position (i.e., switched to neither source of power, and is thus in an "open" condition).

The principal electromechanical components of bypass switch interlock assembly 200 is shown in detail in FIG. 7. It consists of:

a cam 260 mounted on the bypass switch operating mechanism shaft 136;

two interlocking solenoids K6 and K7; and two limit switches S10 and S11. Each limit switch S10 and S11 has two switch contacts S10-1 and S10-2, and S11-1 and S11-2 which act: (1) to prevent bypassing to a dead source and; (2) to delay bypassing to a power source opposite to that to which the automatic transfer switch 128 is switched. This is achieved by causing the solenoid armature pins 230 and 231 (solenoids K6 and K7) to engage apertures 233, 234, 263, and 264 on the periphery of the cam 260 and thereby prevent rotation of the bypass switch operating mechanism shaft 136 until proper operating conditions are obtained.

As shown in FIG. 7, two sets of apertures 233, 263 and 234, 264 are associated with each solenoid K6 and K7. At least one of the solenoids K6 or K7 must be energized (and the associated pin 230 and 231 withdrawn from the cam 260) in order to rotate the bypass mechanism shaft 136. To rotate the cam 260 past the first aperture 233 or 234 power must be available from the power source to which the equipment operator desires to connect the bypass switch 138. Upon rotation of the bypass source selector switch S12 (See FIG. 1) toward the chosen power source, a circuit is completed from the chosen source of power through the bypass source selector switch S12 to the associated solenoid K6 or K7.

If the selected power source is not available, the associated solenoid K6 or K7 cannot be energized and therefore the bypass mechanism shaft 136 cannot be rotated; effectively the solenoid pins 230 and 231 and cam 260 provide a "dead source interlock". If the chosen source of power is available, one solenoid K6 or K7 is energized and the equipment operator can begin rotation of the bypass switch operating handle 135.

Upon initiation of rotation, one of the limit switches S10 or S11 will be engaged by a ridge 273 or 274 (depending on the direction of rotation of the shaft 136) formed on the surface of the cam 260. Upon engagement with the limit switch's actuator arm, the circuit to the energized solenoid K6 or K7 will be broken. In particular, the K6 solenoid pin 260 engages aperture 263 and the K7 solenoid pin 231 engages aperture 264. This acts to *delay* further rotation of the bypass switch operating handle 135 unless or until the automatic transfer switch 128 is removed, is in its "neutral or open" position, or is switched to the *same* source of power as that to which the equipment is attemtping to move the bypass switch 138.

If the automatic transfer switch 128 is "isolated", a set of relay contacts K13-3 and K13-4 (shown in FIG. 16) are closed which completes the circuit *again* for the appropriate solenoid K6 or K7.

If the automatic transfer switch 128 is engaged, one relay contact K15-1 (which closes when the automatic transfer switch 128 is *not* in the emergency position) or K16-1 (which closes when the automatic transfer switch 128 is *not* in the normal position) must be closed to energize one of the solenoids K6 or K7 (again depending on the direction of attempted rotation).

If the solenoid circuit is *not* completed through one of these two relay contacts K15-1 or K16-1, both solenoids K6 and K7 will be deenergized upon engagement of one of the limit switches S10 or S11 with the ridge 273 or 274 on the cam 260, and the associated solenoid pin 230 and 231 will engage the second cam aperture 263 or 264 (associated with the solenoid K6 or K7) to *delay* the rotation of the bypass switch operating handle 135 until the automatic transfer switch 128 has been moved to its neutral or open position.

Referring now to FIGS. 3 and 8, the means for isolating the automatic transfer switch 128 and for interlocking and controlling the automatic transfer switch during isolation will now be explained. The automatic transfer switch isolation operating mechanism 300 consists of:

an isolation mechanism shaft 245;

a handcrank 250 mounted at the free end of the isolation mechanism shaft;

an isolation interlock assembly 301;

a gear box 248 which requires a plurality of rotations to operate a drawout mechanism 352;

a key switch S13 (See FIG. 1); and associated electromechanical devices (which are operationally specifically discussed in connection with FIG. 16 and explained in the succeeding paragraphs).

The automatic transfer switch isolation operating mechanism 300 is operated manually by turning the isolating handcrank 250 (counterclockwise as shown in the drawings) which rotates the gearbox 248 and drives the drawout mechanism 352 to move the automatic transfer switch 128 from the engaged position (FIG. 3) where the switch is connected to the buswork extensions 169, 172 and 175, (through isolating contacts 203, 204 and 205) to the "test position". When the automatic transfer switch 128 is in the test position, the isolating contacts are separated from the buswork extensions, control power is supplied to the automatic transfer switch through a secondary interconnect mechanism 305 (FIG. 9), and the load is supplied from a power source through the bypass switch 138. Further counterclockwise rotation of the isolating handcrank 250 breaks the secondary interconnect mechanism 305 (See FIG. 4b) and fully isolates the automatic transfer switch 128 from all sources of electrical power. When it is in that position, it can be removed from the enclosure 125. Clockwise rotation of the handcrank 250 moves the automatic transfer switch 128 from the fully isolated position (through the test postion) to the engaged position.

The isolation interlock assembly 301 consists of a cam 315 which is keyed to the isolation mechanism shaft 245 and a solenoid K8 which prevents isolation or engagement of the automatic transfer switch 128 when an undesirable system configuration exists. As discussed in more detail in connection with the schematic diagram shown in FIG. 16, the isolation solenoid K8 can be energized to remove or engage the automatic transfer switch 128 only when the automatic transfer switch is in its "neutral" position which is manually initiated by closure of the key switch S13. At all other times, the pin or armature 317 of the isolation solenoid K8 engages an aperture 319 in the associated cam 315 and prevents rotation of the isolation mechanism shaft 245.

Figure 6:
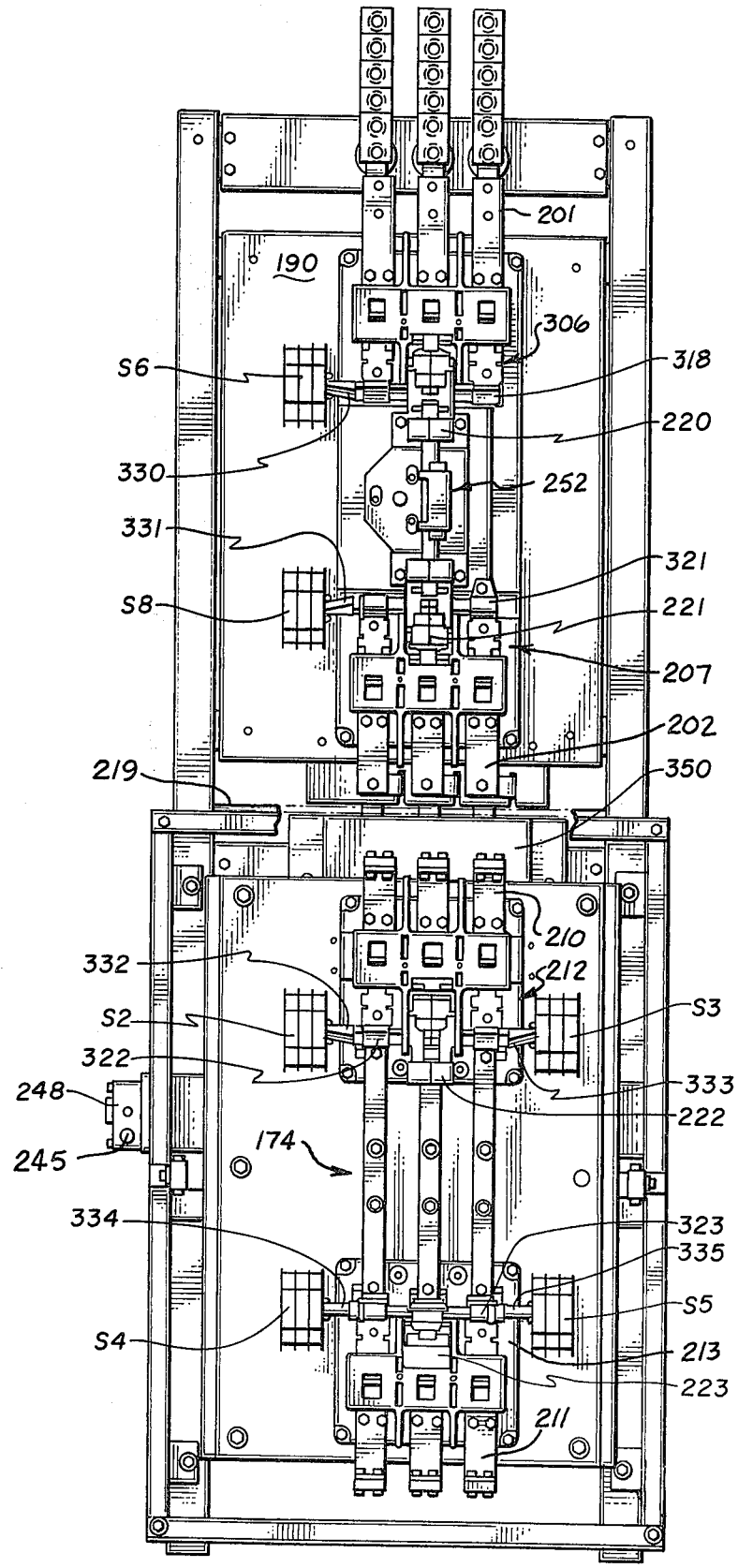
FIG. 6 is a front detail view of the automatic transfer and bypass switch assembly showing the limit switches associated with the contacts which sense the operating condition of the automatic transfer switch and bypass switch.

Referring now to FIGS. 5 and 6, the means for sensing the position of the automatic transfer switch 128 and the bypass switch 138 will now be described. Connected to each bar or arm 318, 321, 322, 323 (which interconnects each set of movable contacts 206, 207, 212 and 213 of the two switches 128 and 138) is a plastic paddle or arm 330, 331, 332, 333 which is disposed to engage a series of limit switches. As shown in the drawings, there are six limit switches S2-1, S2-2, S2-3, S3-1, S3-2 and S3-3 associated with the normal side of the automatic transfer switch 128 and six limit switches S4-1, S4-2, S4-3, S5-1, S5-2 and S5-3 associated with the emergency side of the automatic transfer switch.

Similarly, there are two limit switches S6-1 and S6-2 associated with the normal side of the bypass switch 138 and two limit switches S8-1 and S8-2 associated with the emergency side of the bypass switch. It should be understood, of course, that as many limit switches as desired can be utilized for the control and interlock means of the instant invention or for any other purposes desired by a user of the invention.

Two other limit switches S10 and S11 (discussed above and shown in FIGS. 5 and 7) are used to sense the direction that the bypass switch 138 is being switched (i.e., to the normal source of power or the emergency source of power).

Finally, two limit switches S19 and S20 (shown in FIGS. 5 and 10) are used to sense the removal or insertion of the automatic transfer switch 128 from the frame 185. These limit switches are electrically connected to the isolation interlock solenoid K8 to prevent or permit isolation. This will be discussed in greater detail in connection with the schematic diagram appearing in FIGS. 13, 14, 15 and 16.

Figure 11A:
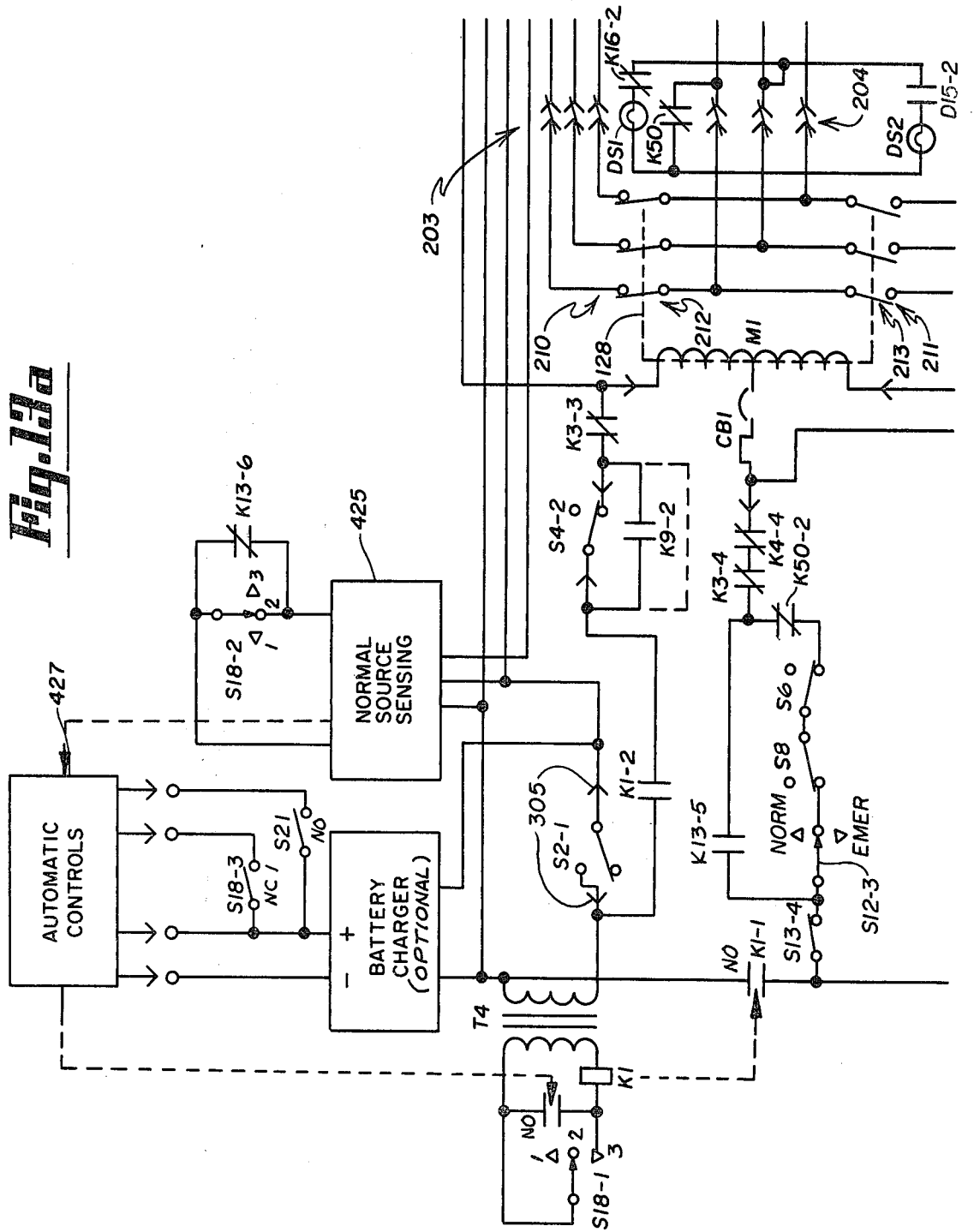

In the event that testing of the automatic transfer switch 128 indicates that maintenance or repair is necessary, the preferred embodiment of the invention includes a unique drawout feature and shutter assembly (best illustrated in FIGS. 8, 11 and 12. A shutter assembly is used to safeguard operating personnel during removal of the automatic transfer switch 128. This assembly includes a set of shutter support arms 320, a linkage operating mechanism, and a shutter 350.

Figure 10A:
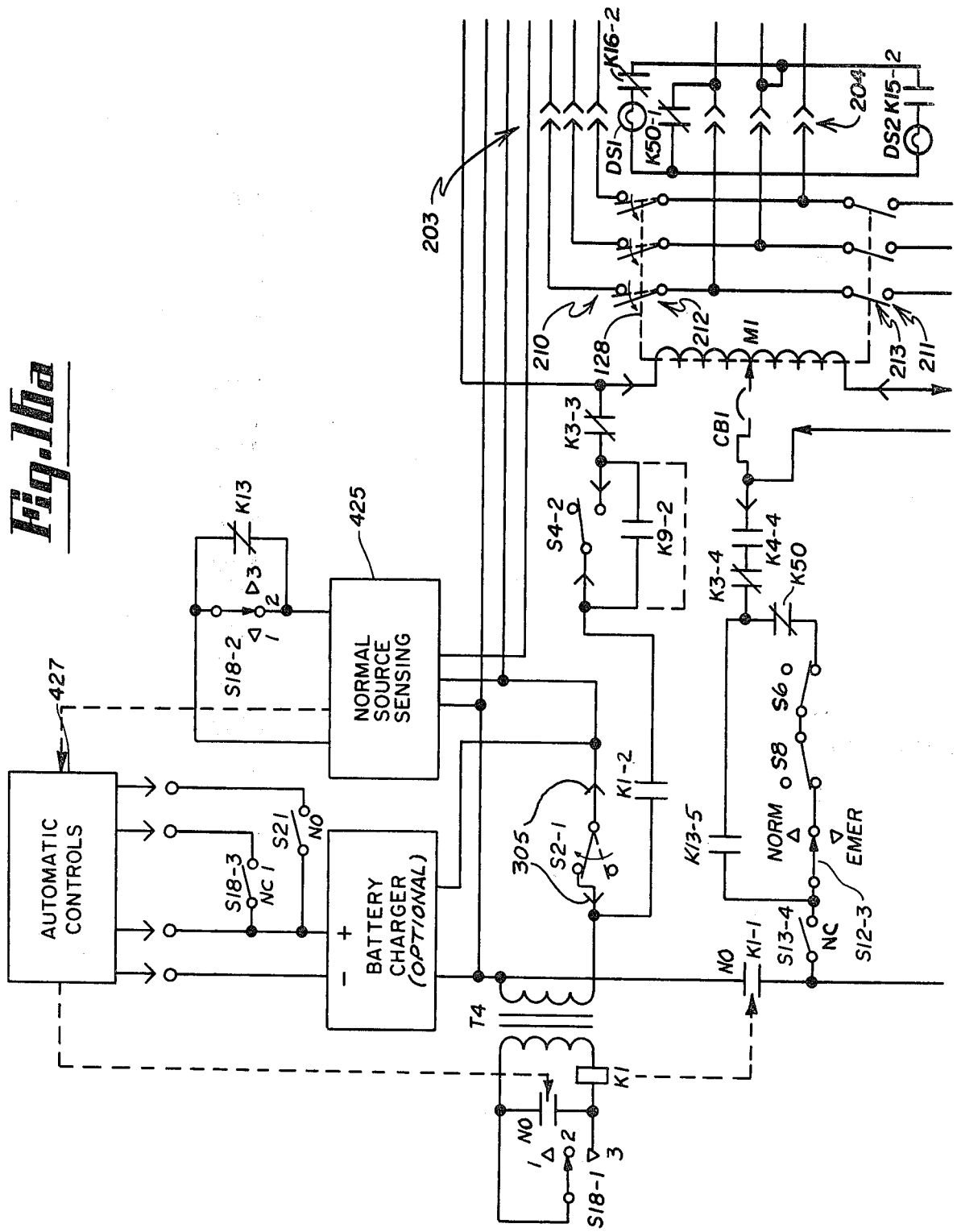

A shutter support arm 320 is disposed rewardly at the upper end of the automatic transfer switch 128. It is used for two purposes. Referring to FIGS. 10a, 10b and 10c, the shutter support arm 320 is used to operate a position sensing means, comprising limit switches S19 and S20, that is operated to indicate when the automatic transfer switch 128 is in its fully engaged position, in its "test" position, or in its isolated or withdrawn position.

The first limit switch S20 is closed when the automatic transfer switch 128 is fully inserted and not isolated (See FIG. 10a). Isolation of the automatic transfer switch 128 (by rotation of the isolation handcrank 250) causes the first limit switch S20 to open. The second limit switch S19 however, rides on the top of the shutter support 320 and remains closed until the shutter support arm passes the position shown in FIG. 10b. When the first limit switch S20 is open and the second limit switch is closed, the automatic transfer switch 128 is said to be in its "test position"; here all of the isolating contacts 203, 204 and 205 have been separated from the buswork extensions 169, 172 and 175 and the secondary interconnect mechanism 305 is engaged (as shown in FIG. 9). In this position, the various tests of the automatic transfer switch 128 can be performed; here control power is supplied through the secondary interconnect mechanism 305 to the automatic transfer switch actuator motor M1 and the associated controls and indicating lights. In this operational configuration a loss of power from the normal or the emergency supply can be "simulated" to be sure that the automatic transfer switch 128 is operating properly.

The support arm 320 is also used to raise and lower a bell crank 344 with a roller cam 340 at one end which is pivotably connected to the frame 185 to follow the position of the base of the shutter support arm 320 relative to the frame. This bell crank 344 drives a link 345 which is pivotably connected to a lug 346 joined to a shutter 350. The shutter is constrained to move vertically within the support frame 185 between an open and a shut position. The shutter is formed from insulating material and is disposed between the buswork extensions 169, 172, and 175 and the isolating contacts 203, 204, and 205. When the shutter 350 is "open" (FIG. 11), the automatic transfer switch can be moved to mate with the buswork extension by passing through apertures 354 in the shutter (See FIGS. 4, 10, 11 and 12). The shutter 350 is lowered in the event the automatic transfer switch 128 is removed from the enclosure 125, thereby shielding the busbar extensions 169, 172, and 175 (See FIG. 11).

The draw-out mechanism 352 is shown in phantom in FIG. 4b and in FIG. 8. Specifically, the gear box 248 rotates an arm 249 which is pivotably connected to a locking bar or arm 353 which is biased by a spring 355 to hold a notch 357 in the locking bar 353 over a locking pin 359 which is connected by the automatic transfer switch 128. When the gear box is rotated to withdraw the automatic transfer switch 128, the arm 249 is rotated clockwise which drives the locking bar 353 towards the front of the frame 185 thereby moving the automatic transfer switch away from the busbar extension 169, 172, and 175.

To remove the automatic transfer switch 128 from the enclosure 125, that is, to withdraw it from the frame 185 beyond the limit of of travel of the locking bar 353, a handle (not shown for purposes of clarity) operatively attached to the locking bar must be raised against the biasing tension of the spring 355. At this point the shutter bell crank 344 is released (as best shown in FIG. 10c) to "close" the shutter 350 so it assumes the configuration shown in FIG. 12. In this configuration, the elements of the associated buswork cannot be physically contacted from the front of the enclosure 125.

To reinsert the automatic transfer switch 128 the release handle for the locking bar 353 must be raised. Further insertion of the transfer switch causes the shutter support arm 320 to engage the shutter bell crank 344 which raises the shutter 350. In this manner the shutter 350 is always held "open" when the automatic transfer switch 128 is in the enclosure 125 and "closed" when the automatic transfer switch is removed from the enclosure.

One final element remains to be described. The secondary interconnect mechanism 305 is illustrated in FIGS. 4b and 9. That mechanism basically consists of a set of mating, multiple pin, electrical plug halfs 302M and 302F. One plug half 302F is fixed to the automatic transfer switch 128. The other plug half 302M is carried on a spring loaded craddle 303 which is carried by the switch assembly support frame 185. The craddle 303 is guided in horizonal movement by a set of parallel rails 304 and a set of guides 306. The forwardly disposed ends of the rails 304 mate with a set of alignment guides 307 joined to the automatic transfer switch 128. Thus, when the automatic transfer switch 128 is moved rearwardly toward the rear end of the frame 185, the two tubular guides 307 telescope into the guide rails 304 thereby aligning the two halfs 302M and 302F of the plug. The craddle spring 309 is preferably provided with an adjustment screw 310 to control the tension or force on the craddle 303. Thus, when the automatic transfer switch is fully inserted into the frame, the spring 309 insures that the two plug halfs 302M and 302F mate together and form a good electrical contact.

OPERATION

FIGS. 13 through 16 are schematic diagrams of the sensing and control means the purpose of which is to: Sense the operating condition of the automatic transfer switch 128 and the bypass switch 138; to interlock the operation of the bypass switch with the transfer switch; and to interlock the operation of the isolation features with the automatic transfer switch. Before describing the details of the integrated operation of the electromechanical controls that are the subject of this invention, the principal control components will be reviewed.

The manual push button controls S21 and S22, the bypass source selector switch S12, and the isolation key switch S13 are mounted on the face of the enclosure 125 illustrated in FIG. 1.

As discussed above, two limit switches S6 and S8 are associated with the normal switch contacts 206 and the emergency switch contacts 207 of the bypass switch 138 (see FIG. 6) four limit switches S2, S3, S4, and S5 are associated with the normal switch contacts 212 and the emergency switch contacts 213 of the automatic transfer switch 128, and two limit switches S19 and S20 (See FIG. 10) are associated with the shutter support arm 320 to indicate: when the automatic transfer 128 is engaged; when the automatic transfer switch is not engaged; and when the automatic transfer switch is in its test position.

An isolation interlock solenoid K8 is operatively positioned relative to the isolation cam 315 (see FIG. 8) and two solenoids K6 and K7 are operatively positioned relative to the bypass switch interlock assembly 200 (see FIG. 7) which also employs two limit switches S10 and S11 to determine the direction of rotation of the bypass switch operating handle 135.

A plurality of relays K1 through K5, K9 through K16, K30, K40, K50 and K131, and associated relay contacts are used to interconnect the various switches and switch controls. These relays are preferably located within the enclosure 125. They are preferrably interconnected in the manner shown in FIGS. 13 through 16 to accomplish the automatic control function that is the subject of the invention.

Referring to FIG. 13, the normal source of power is shown available and the bypass switch 138 is positioned in the automatic mode of operation (i.e., connecting neither power source to the load). The automatic transfer switch 128 is shown fully inserted (i.e., the isolating contacts 203, 204, and 205 are closed to connect the normal source of power to the load through the movable contacts 212 and the normal power stationary contact blocks 210). Since the automatic transfer switch 128 is engaged and energized, all secondary disconnects are closed via the secondary interconnect mechanism 305. Power is supplied to the transfer switch control circuit 403 (FIG. 13b) from the normal source of power through a normal power transformer T1. Power is connected to one side of the control circuit 403 from one side of the secondary winding of the normal power transformer T1 (through normally closed relay contact K5-1 along line 407) and from the other side of the secondary winding of the transformer (through normally closed relay contact K5-2 along line 409) to the other side of the control circuit.

When the automatic transfer switch 128 is in its normal position, limit switch contact S3-1 (in control circuit 403) is closed. This energizes a status light DS5 indicating that the transfer switch is in its "normal" position. When the transfer switch is in its normal position, limit switch contact S5-1 remains closed which energizes relay K15. Since the transfer switch is fully inserted, normally open limit switch S20 is also closed. Therefore, relay K50 is energized which closes the normally open K50 relay contacts.

Power is also supplied to a bypass switch normal source solenoid circuit 410 along lines 412 and 413. This energizes a status light DS3 indicating that the normal source of power is available. Normally open relay contact K15-1 closes upon energization of relay K-15 so that, if the bypass source selector switch S12 is rotated toward its normal position, switch contact S12-1 is closed. This allows the K6 solenoid to be energized and the associated pin 230 to be withdrawn thereby allowing the bypass switch 138 to be moved to the normal position.

Power is supplied to the load from the normal buses 159 through the isolating contacts 203 to the normal power stationary contact blocks 210 of the automatic transfer switch 128, through the transfer switch movable contacts 212 to the load busbars, and through the separable contacts 204 to the load bus 158. When status light DS1 is energized, it indicates that the normal power source is supplying the load through the automatic transfer switch. Specifically, status light DS1 is energized from one phase on the load side of the separable contacts 204 through normally closed relay contact K16, and through normally closed relay contact K50 to a second phase of the load bus 158.

Since no emergency power is assumed to be available to the bypass switch emergency source solenoid circuit 415, solenoid K7 is not energized and the bypass switch 138 cannot be moved to the emergency position (see FIG. 7).

Since key switch S13-3 in the isolation interlock circuit 405 has not been closed, power is not available to the isolation solenoid K8 and the automatic transfer switch 128 cannot be withdrawn from the frame 185 (see FIG. 8).

Figure 14B:
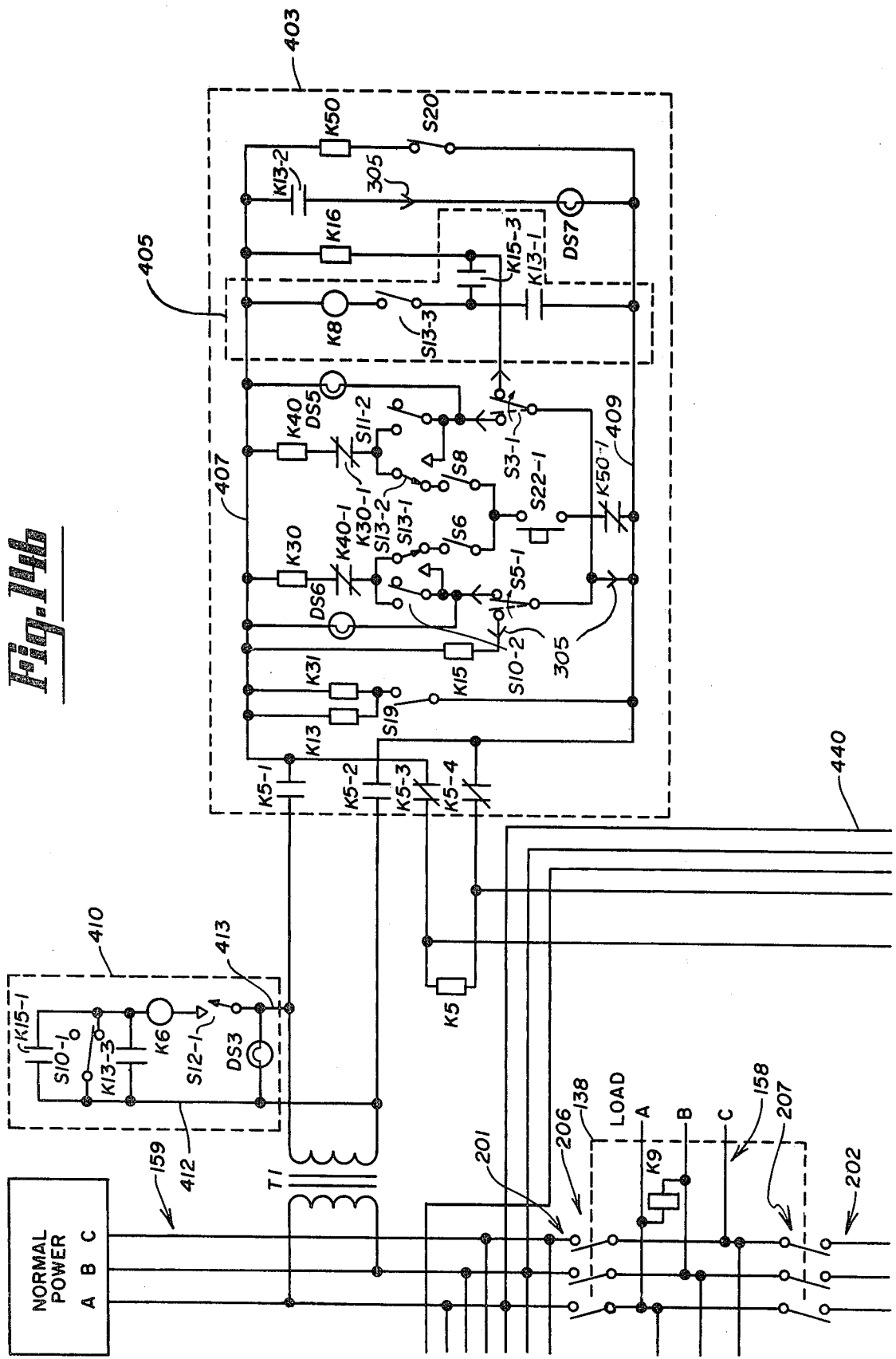
Figure 14C:
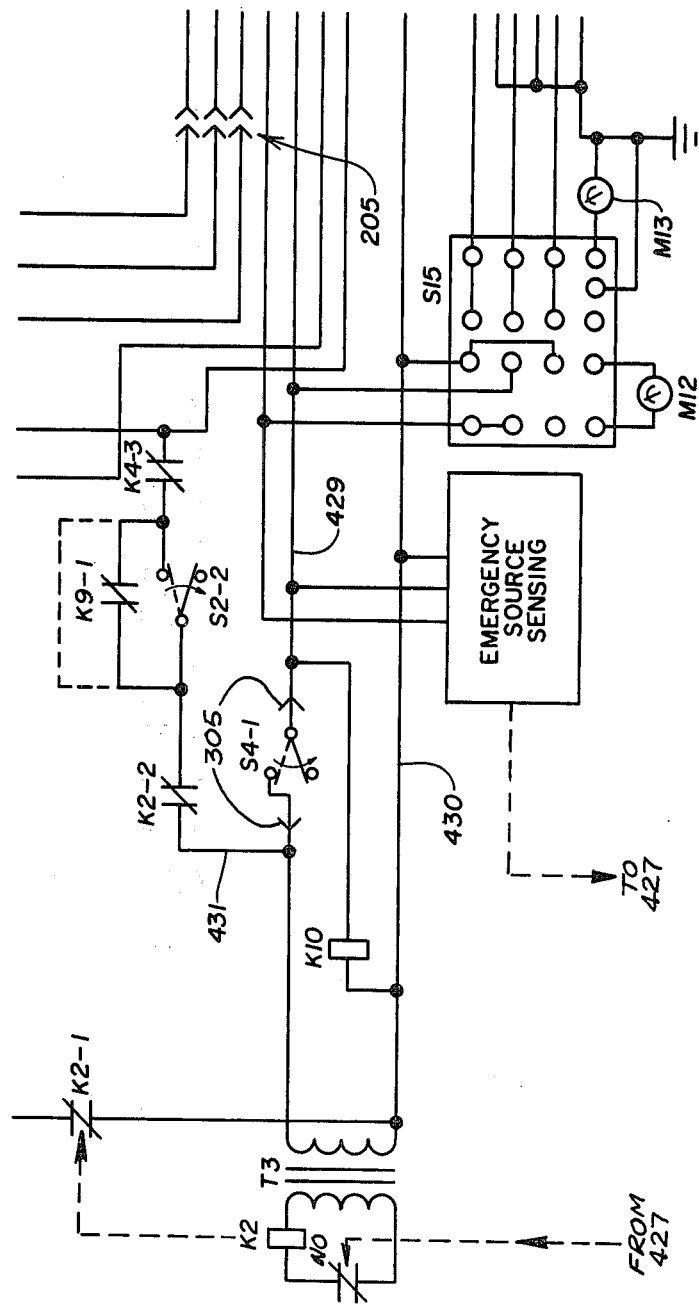

FIG. 14 shows the configuration of the various switches when the normal power source fails. Typically, this failure is sensed by automatic controls 425 and 427 which start an emergency diesel/generator set. As will be explained shortly, circuity is provided to rotate the automatic transfer switch 128 to switch the load from the normal source of power to the alternate source of power (see arrows by switch contacts 212 and 213 on FIG. 14a).

Loss of the normal source of power is detected by a normal source sensing circuit 425 which closes a relay contact to start an emergency generator or otherwise connect an alternate source of power to the automatic transfer switch and bypass switch assembly 120. When the alternate or emergency source of power is available, power is supplied to the automatic transfer switch control circuit 403, and the transfer switch motor actuator circuit 404 from the emergency source bus 157, from the secondary winding of emergency power transformer T2. This energizes status light DS4 in the bypass switch emergency source solenoid circuit 415 since it is also connected across the transformer T2. When DS4 is energized, it indicates that the emergency source of power is available.

The frequency meter M14 and running time meter M15 mounted on the front of the enclosure 125 (see FIG. 1) are also connected across the secondary winding of the transformer T2 so that the performance of the alternate source power can be conveniently monitored. Also connected across the secondary winding of the transformer T2 (by lines 426 and 427) is a relay K5. Normally closed contacts K5-1 and K5-2 of relay K5 are connected in series with the secondary winding of the normal power transformer T1. Upon energization of this relay K5, contacts K5-1 and K5-2 open and normally open contacts K5-3 and K5-4 (associated with the secondary winding of the emergency power transformer T2) close, thereby providing power from the emergency power source to the automatic transfer switch control circuit 403.

Relay K14 (connected directly across two phases of the emergency power bus 157) operates in a manner similar to that of relay K5. When energized two normally closed contacts K14-3 and K14-4 (in series with the normal power bus 159) open and two normally open contacts K14-1 and K14-2 (connected in series to the emergency power bus 157) close, thereby providing power to the automatic transfer switch actuator circuit 404.

The emergency source of power is also connected (along line 429 through switch contact S4-1; see FIG. 14c) to the secondary winding of a third transformer T3 (and back along line 430 to a second phase of the emergency power bus 157). The secondary winding of this transformer T3 is connected to a time delay relay K2 which, after a pre-selected time delay, closes two normally open relay contacts K2-1 and K2-2. This connects power to the actuator motor winding M1 to transfer the automatic transfer switch 128 so that the alternate source of power can supply the load.

Power is supplied to the actuator motor winding M1 from one phase of the emergency power bus 157 (along line 429; through limit switch contact S4-1; along line 431 through relay contact K2-2 through limit switch contact S2-2; and through normally closed relay contact K4-3) and from another phase of the emergency power bus (through normally closed relay contacts K4-4 and K3-4; through relay contact K50-2; through limit switches S6 and S8, both of which are closed since the bypass switch 138 is in "auto" and not bypassed to "emergency" or "normal"; through the bypass source selector switch contact S12-3, which is set to "auto"; through the normally closed key switch contact S13-4; through closed relay contact K2-1; and line 430).

When the automatic transfer switch movable contacts 212 open (from the position shown in phantom in FIG. 14a), the normal power source is disconnected from the load. Limit switch contact S2-2 then opens which removes power from the motor winding M1. The transfer switch will stay in the open position until time delay relay K9 (connected across the load bus 158) times out. Typically, the time between switching from the normal power source to the emergency power source is delayed as much as fifteen seconds. After the pre-selected time delay, relay contact K9-1 again closes to supply power to the actuator motor winding M1 until the automatic transfer switch 128 moves to the emergency position which closes the movable contacts 213. Emergency power is thereby connected to the load as shown in FIG. 14.

When the transfer switch movable contacts 213 are in the emergency position, normally closed limit switch contact S4-1 (interconnecting lines 429 and 431) opens removing power from the actuator motor winding M1. During the transfer, relay K50 remains energized since the automatic transfer switch 128 is fully engaged (i.e., normally open limit switch S20 remains closed to supply power to transfer relay K50).

As soon as the automatic transfer switch movable contacts 212 (associated with the normal power bus 159) are switched from the normal power stationary contact blocks 210, limit switch contact S3-1 (in the automatic transfer switch control circuit 403) changes state. This deenergizes status light DS5 and energizes relay K16. Limit switch contacts S3-2 and S303 in the motor actuator control circuit 404 change position in a similar manner. A relay contact K16-2 (associated with the relay K16) extinguishes status light DS1.

As soon as the automatic transfer switch 128 movable contacts 213 (associated with the emergency power bus 157) are switched to the normal power stationary contact blocks 211, limit switch contacts S5-1, S5-2, and S5-3 change position (i.e., move from the position shown in FIG. 13 and in phantom in FIG. 14, to the position shown in solid in FIG. 14). Switch contact S5-1 (in control unit 403) deenergizes relay K15 and energizes status light DS6 (indicating the automatic transfer switch 128 is in the emergency position). Normally closed relay contact K15-2 closes when relay K15 is deenergized and relay contact K50-1 remains closed, thereby energizing status light DS2 indicating that emergency power is supplying the load.

As noted above, switch contact S3-2 opens upon initiation of the transfer and S5-3 does not close until the transfer is complete. Therefore, the motor actuator circuit 404 will not cause a transfer to take place while the loss of source transfer is occurring unless the reset button S22 is pushed.

In the event that normal power is regained, and the emergency source is deactivated, the complementary circuitry shown in FIG. 14 responds in a similar manner to supply power through the left hand side of the actuator motor winding M1 (i.e., the top half as shown in FIG. 14a) and to automatically actuate the transfer switch 128 to switch the load back to the normal source of power.

Figure 15C:
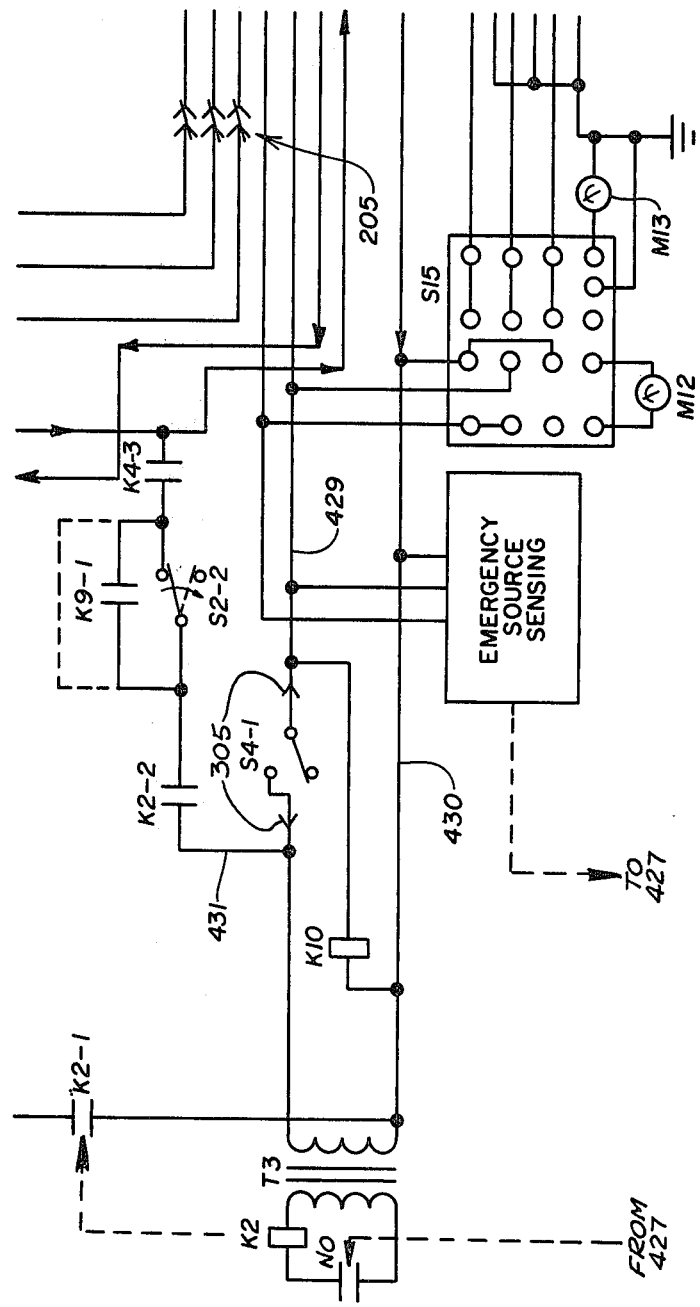

FIG. 15 shows how "a bypass" can be made to the alternate or emergency source of power when the automatic transfer switch 128 is initially connecting the load to the normal source of power. If the emergency source of power is not available, the bypass switch emergency source interlock solenoid K7 (in control circuit 415) cannot be energized and thus the bypass cannot be made. Therefore, the equipment operator must manually start the emergency power source (i.e., using push button switch S21).

When the emergency power source is running, status light DS4 across the secondary winding of emergency power transformer T2 will be energized (thereby indicating that the emergency power source is available). Since the automatic transfer switch 128 is supplying the load from the normal source of power, all switches, status lights and relays will initially be positioned as shown in FIG. 13. To initiate the bypass, the bypass source selector switch S12 must be manually turned to its "emergency position". It must remain in this position while bypassing. This opens switch contact S12-3 (associated with the actuator motor winding M1) which removes the possibility of automatic transfer of the transfer switch 128 through the control paths discussed in connection with FIG. 14. Switch contacts S12-1 and S12-2 provide power to the normal source and emergency source interlock solenoid circuits 410 and 415.

Upon rotation of the bypass switch operating handle 135, limit switch S11 will be picked up by the ridge 274 on the bypass interlock assembly cam 260 (see FIG. 7). This opens limit switch contact S11-1 in the emergency power interlock solenoid circuit 415 thereby deenergizing the emergency source interlocking solenoid K7 and causing the associated pin 231 to catch in the aperture 264 in the bypass interlock assembly cam 260.

Similarly, limit switch contact S11-2 in the transfer switch control circuit 403 will be moved to the position as shown in FIG. 15. This connection energizes drive relay K40 from the secondary winding of the emergency power transformer T2 (i.e., along 426, through closed contact K5-3, along line 407, through relay K40, through normally closed contact K30-1; through switch contact S11-2, through switch contact S-1, along line 409, through relay contact K5-4, and along line 427 to the other side of the secondary winding of the transformer T2). As shown in the drawings, K40 is a "drive relay" for relay K4 in the automatic transfer switch motor actuator circuit 404. Relay K40 is electrically cross-connected with another relay K30, in the transfer switch control circuit 403 so that relay K30 cannot be energized when relay K40 is energized.

Closure of relay switch contact K40-2 (in the transfer switch motor actuator circuit 404) energizes relay K4 from the emergency source busbars 157 (i.e., through closed relay switch contact K14-1, along lines 430 and 431, through relay K4, through closed relay switch contact K40-2, lines 434 and 435, and through relay switch contact K14-2 to the emergency source busbars 157). When relay K4 is energized, power is supplied to the transfer switch actuator motor M1 from the transfer switch motor actuator circuit 404 (i.e., the power is supplied from the emergency source busbars 157, through the relay switch contact K14-1, along lines 430 and 431 through closed relay switch contact K4-1, along lines 430 and 431 through closed relay switch contact K4-1, through limit switch contact S3-2, through limit switch contact S5-3 and line 460, through circuit breaker CB1 to the motor winding M1, from the winding along line 462, through closed relay switch contact K4-2 along lines 434 and 435, and through relay switch contact K14-2 to the emergency source busbars).

When the automatic transfer switch movable contacts 212 leave the normal position, limit switch contacts S3-1 and S3-2 open, thereby deenergizing drive relay K40 (and relay K4) and removing power from the transfer switch actuator motor winding M1. This moves the automatic transfer switch 128 to the "neutral" or open position. Therefore, the bypass to the emergency power source can then be completed. In particular, since switch contact S3-1 in the transfer switch control circuit 403 moves from the position shown in phantom in FIG. 15 to the solid position, relay K16 is energized (which closes relay contact K16-1 to provide power to the emergency power source interlock solenoid K7 in circuit 415). When K7 is energized the associated solenoid pin 231 is therefore withdrawn from the second aperture 264 in the interlock cam 260 thereby permitting rotation of the bypass switch 138 to the "emergency" position.

The automatic bypass switch 138 can also be used to switch the load from the emergency source of power to the normal source of power. The complementary relays and switches associated with the emergency side (i.e., circuits in the lower portion of FIG. 15a) will be operated in an analogous manner. This should be clear to those skilled in the art from the foregoing description.

Figure 16A:
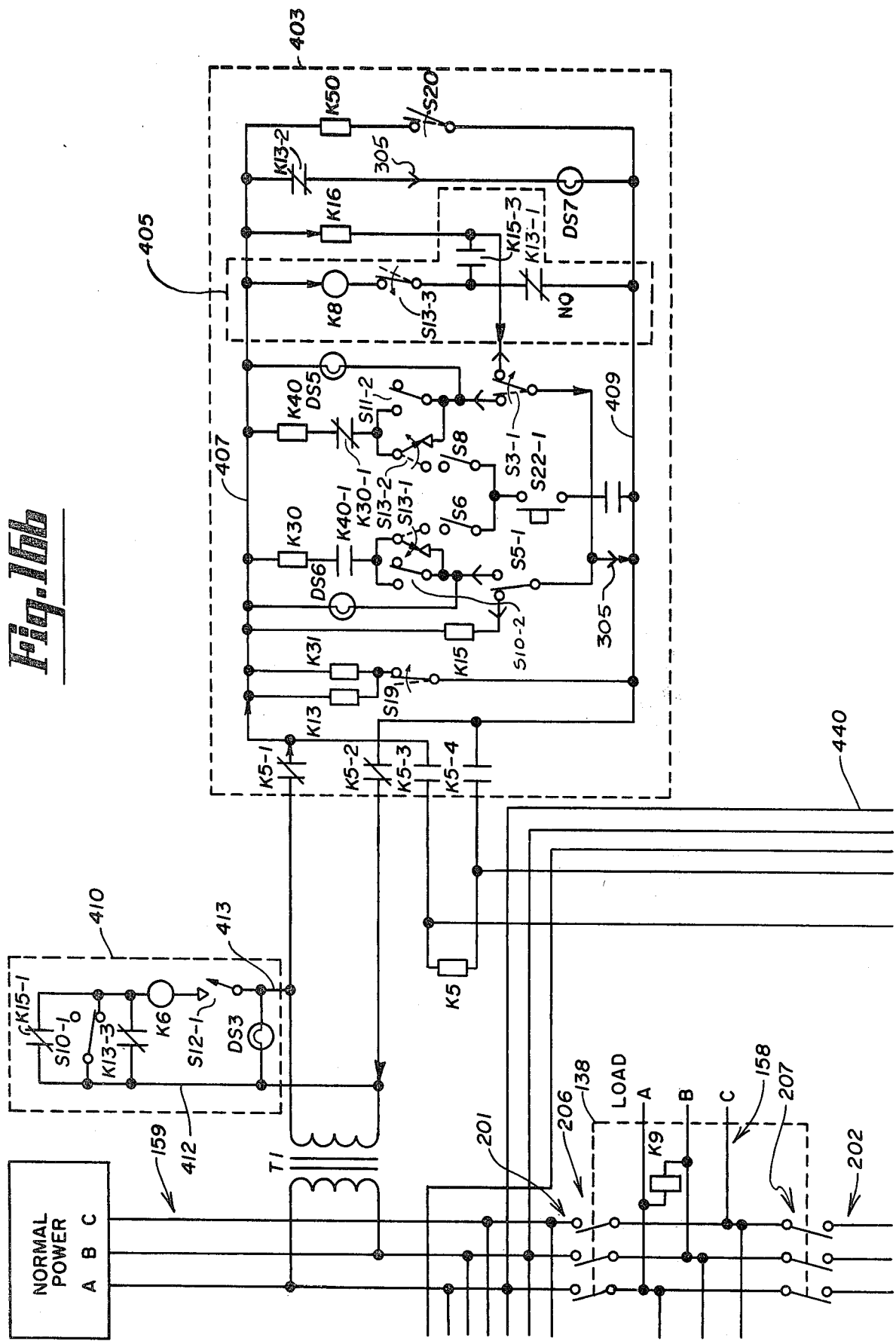

The isolation interlock feature of the present invention is best understood with reference to FIG. 16. From the foregoing discussion it should be clear that isolation can occur only *after* the automatic transfer switch 128 has been switched to the neutral or deenergized position. It should also be understood by those skilled in the art that, if the automatic transfer switch 128 is deenergized and in a position other than the neutral position, then the sequence of operations about to be explained will occur when the secondary disconnects (within the secondary interconnect mechanism 305) are connected together which, as was previously explained, occures prior to engagement of the separable switch contacts 203, 204 and 205 (which connect the automatic transfer switch to the two power sources and the load).

In FIG. 16 it is assumed that all relays, solenoids, relay switches, and the like are initially in the position shown in FIG. 13 (i.e., the automatic transfer switch 128 is in its "normal" position whereby the normal source of power supplies the load, and the bypass switch 138 is in its "automatic" position) before the equipment operator attempts to "isolate" the automatic transfer switch.

Initially, isolation will be impossible because the isolation solenoid K8 (in the isolation interlock circuit 405) is deenergized. Therefore, the isolation cam 315 (FIG. 8) cannot be rotated by the isolation mechanism shaft 245.

Upon rotation of the isolation key switch S13, switch contacts S13-1 and S13-2 (in the automatic transfer switch control circuit 403) move to the position shown in FIG. 16; switch contact S13-3 (in isolation interlock circuit 405) closes; and contact S13-4 (associated with actuator motor winding M1) opens. Switch constact S13-2 energizes drive relay K40 (i.e., from one side of the secondary winding of normal power transformer T1 through relay switch contact K501, along line 407, through drive relay K40, through normally closed relay contact K30-1, through switch contact S13-2, through switch contact S301, to line 409, and through relay contact K5-2 to the other side of the secondary winding of the transformer). Relay contact K40-2 closes when the drive relay K40 is energized; this energizes relay K4 in the transfer switch motor actuator circuit 404.

Closure of normally open relay contacts K4-1 and K4-2 cause the transfer switch actuator motor M1 to move the automatic transfer switch 128 to the open or neutral position (power is supplied to the transfer switch actuator motor M1 from the normal source along line 440, through closed relay contact K14-4, along line 431 through closed relay contact K4-1 through switch contact S3-2, through switch contact S5-3 to line 460 through the actuator motor winding M1, to line 462 through closed relay contact K4-2, along line 434 through relay contact K14-3, and along line 441 back to the normal source of power). When the automatic transfer switch reaches the open or neutral position, limit switch contacts S301 and S302 change state which deenergizes relays K40 and K4, thereby removing power to the transfer switch actuator motor M1.

Once the automatic transfer switch 128, leaves the normal source of power and moves to the open or neutral position, switch contact S3-1 in the transfer switch control circuit 403 moves to the position shown in solid in FIG. 16, thereby energizing relay K16. This opens relay switch contact K16-2 and deenergizes the status light DS1 indicating that the normal source of power is no longer supplying the load. Since the normal source of power is still available, isolation solenoid K8 (in the isolation interlock circuit 405) is energized (i.e., from one side of the secondary winding of normal power transformer T1, through relay contact K501, line 407, through isolation solenoid K8, through switch contact S13-3, through closed relay contact K15-3, through contact S3-1, along line 409 through relay switch contact K5-2, and to the other side of the secondary winding of the transformer). Thus, the isolation cam 315 no longer prevents rotation of the isolation mechanism shaft 245. Isolation handle 250 can then be rotated to isolate the automatic transfer switch 128.

When the automatic transfer switch 128 is withdrawn to the position where limit switch S19 is released (see FIG. 10c), switch contact S19 in the transfer switch control circuit 403 moves to the position shown in FIG. 16 thereby indicating that isolation of the automatic transfer switch from the separable switch contacts 203, 204, and 205 has occurred, and that the secondary contacts of the secondary interconnect mechanism 305 (see FIG. 9) are still made-up. The release of limit switch S19 energizes control relays K13 and K31. Upon energization of K13, relay contact K13-1 closes so that the power to the isolation solenoid K8 is maintained. Relay contact K13-2 also closes which energizes status light DS7 to indicate that the automatic transfer switch 128 is in its "test position". Until the secondary contacts of the secondary interconnect mechanism 305 open, (which removes power to control circuit 403) this condition will remain in effect. As long as the secondary contacts are closed, all functions of the automatic transfer switch 128 can be tested.

While in the test position, no power will be sent to the load unless the bypass switch 138 is switched to its normal or emergency position (i.e., the separable switch contacts 203, 204 and 205 have separated from the normal, emergency, and load buswork extensions 169, 172, and 175). Closure of the normally open relay contacts associated with control relay K13 permit this operation.

From the foregoing it should be obvious to those skilled in the art that there are many other control circuit variations which can be developed from the arrangement specifically shown in the drawings. For example, similar transfers may be made if the automatic transfer switch 128 is initially positioned to the emergency source of power. All such operational sequences are within the scope and spirit of the invention and, consequently, the foregoing discussion is not meant to limit the invention as claimed, but only to lead to a better understanding of the operation of the combination of elements which form the invention.

It should be also obvious from the foregoing description that the electromechanical sensing elements, that is, the limit switches, can be conveniently arranged to sense contact movement in various ways depending on the particular switch used. Similarly, the solenoid controlled interlock cams may be adapted to any control exhibiting relative motion for the purposes of the invention. Other variations are possible and those variations are limited only to the equipment available and the skill of the designer (e.g., and two apertures can be used in the bypass switch interlock assembly rather than two solenoids and four apertures, drive relays K30 and K40 can be replaced so that relay coils K3 and K4 are energized directly to simplify the control circuitry, etc.). Also, with minor rearrangement of the switch contacts, the automatic transfer switch can be configured to automatically switch the load to the same source of power to which the bypass switch is being manually switched instead of going to the open position. Thus, the electromechanical arrangement of the instant invention is extremely flexible and may be put to a wide variety of uses with similar switching arrangements. All such uses are intended to fall within the structures covered by the appended claims.

What is claimed is as follows:

1. An automatic transfer switch and bypass switch assembly for interconnecting a normal source of power or an alternate source of power to a load, comprising:
   a. a three postion motor operated transfer switch having three alternative postions; an open position, a position for connecting the normal source of power to the load, and a position for connecting the alternate source of power to the load;
   b. a three position manually operated bypass switch for bypassing the automatic transfer switch and alternatively connecting the load to the normal source of power, or to the alternate source of power, or to neither source of power;
   c. position sensing means for sensing the position of said transfer switch and the position of said bypass switch;
   d. power sensing means for sensing the availability of both the normal and the emergency sources of power;
   e. operation sensing means for sensing when said bypass switch is being manually operated to connect the normal source of power to the load or to connect the alternate source of power to the load; and
   f. automatic means, electromechanically interlocking said transfer switch and said bypass switch and operating in response to said position sensing means, said power sensory means and said operation sensing means, for actuating said transfer switch to disconnect the load from the source of power to which said transfer switch is connecting the load if said bypass switch is manually operated to connect the other source of power to the load.

2. The switch assembly of claim 1, wherein said operation sensing means includes:
   a rotatable control for manually switching said bypass switch to connect either source of power to the load;
   a cam attached to said control, whereby said cam rotates in the same direction as said control; and
   detection means, operatively associated with said cam, to detect the direction of rotation of said control.

3. The switch assembly of claim 1, wherein said automatic transfer switch is switched to its open position if the bypass switch is manually switched to connect a different source of power to the load than the source of power to which the transfer switch is connecting the load.

4. The switch assembly of claim 1, wherein said automatic means actuates said transfer switch to connect the load to the same source of power to which the bypass switch is being switched if the bypass switch is manually operated to connect a different source of power to the load than the source of power to which the transfer switch was originally connecting the load.

5. The switch assembly of claim 1, wherein said transfer switch includes control means, operatively associated with said position sensing means and said power sensing means, for actuating the transfer switch to connect said load to an available source of power if the source of power to which the transfer switch is initially connected becomes unavailable and if the bypass switch is not connected to the available source of power.

6. The switch assembly of claim 3, wherein said automatic means includes delaying means, operatively associated with said position sensing means, for delaying manual switching of said bypass switch until after said transfer switch is in its open position.

7. The switch assembly of claim 6, further including relay means for bypassing the operation of said delaying means if said transfer switch is connected to the same source of power to which said bypass switch is being switched.

8. The switch assembly of claim 2, wherein said cam defines at least one surface irregularity formed in or on the surface of the cam; and wherein said detection means is positioned fixedly relative to said cam to detect the relative position of said surface irregularity.

9. The switch assembly of claim 1, further including interlocking means for preventing said bypass switch from being operated to connect said load to a dead source.

10. The switch assembly of claim 9, further including means, operatively associated with said power sensing means, for lockingly engaging said cam if said control is operated to switch the bypass switch to a dead source.

11. An electromechanically controlled transfer switch and bypass switch assembly for interconnecting a normal source of power or an emergency source of power to a load, comprising:
  a. a support frame for housing electrical buses associated with said normal source of power, said emergency source of power and said load;
  b. a three position removable automatic transfer switch having three alternative switch positions: an open position, a position for connecting the normal source of power to the load, and a position for connecting the alternate source of power to the load, said transfer switch being removably carried by said frame between a fully inserted location where said transfer switch is electrically connected to said buses and an isolated location where said transfer switch is electrically disconnected from said buses;
  c. removal means for moving said transfer switch within said frame between said inserted location and said isolated location;
  d. a bypass switch, carried by said frame, for selectively connecting the load to the normal source of power, or the alternate source of power, or to neither source of power; and
  e. sensing and controlling means, operatively associated with said transfer switch and said frame, for interlocking the operation of said removal means with said bypass switch regardless of the initial position of the bypass switch.

12. The switch assembly of claim 11, wherein said sensing and controlling means includes:
  sensing means for sensing the position of said automatic transfer switch; and
  control means, connected to said transfer switch and connected to and responsive to said sensing means, for switching said automatic transfer switch to its open position to permit removal of the transfer switch from said frame.

13. The switch assembly of claim 11, wherein the operation of said sensing and controlling means is independent of the initial position of the bypass switch and the initial position of the transfer switch.

14. The switch assembly of claim 11, wherein said sensing and controlling means includes means for delaying the operation of said removal means until said transfer switch is switched to its open position.

15. The switch assembly of claim 11, further including:
  a set of separable contacts for removably connecting the automatic transfer switch to said electrical busses associated with both sources of power and said load;
  and wherein said removal means moves said automatic transfer switch in two directions within said frame, in a first direction to disengage said separable contacts and in a second direction to engage said separable contacts, whereby said automatic transfer switch is electrically disconnected from said load solely by the act of moving said automatic transfer switch within said frame.

16. The switch assembly of claim 15, wherein said sensing and controlling means includes means for sensing the location of said automatic transfer switch relative to said frame.

17. the switch assembly of claim 16, further including:
  secondary contact means for supplying power to actuate the automatic transfer switch when said separable contacts are disengaged, said contact means including a plurality of paired contacts which are carried by said frame and said automatic transfer switch respectively, said paired contacts being electrically disconnected when said automatic switch is intermediate its fully inserted and its isolated postion; and
  wherein said location sensing means includes a first sensing means for determining whether or not said separable contacts are engaged and second sensing means for determining whether or not said paired contacts are electrically connected together.

18. The switch assembly of claim 17, further including:
  a. means for manually operating said automatic transfer switch; and
  b. status means to indicate when the separable contacts have been disengaged and when the paired contacts are electrically connected together, thereby defining when said automatic transfer switch is in its test location within said frame and when the operation of the transfer switch can be manually tested without interrupting power to said load.

19. The switch assembly of claim 11, wherein said removal means includes:
  a. an isolation shaft rotatably connected to the frame;
  b. a gear assembly, carried by said frame and operatively rotated by said shaft, for driving an arm through an arc;

c. a locking pin attached to said automatic transfer switch;

d. a locking link, driven by said gear assembly arm at one end and having an aperture therein at the opposite end which is adapted to catch said locking pin, for converting the rotation of said shaft into rectilinear motion to move said automatic transfer switch within said frame; and e. means for biasing said locking link to engage the locking pin on the transfer switch.

20. The switch assembly of claim 19, wherein said sensing and controlling means includes:

a. a cam having at least one aperture therein fixedly secured to said isolation shaft; and b. at least one solenoid positioned on said frame relative to said aperature on said cam so that the armature of said solenoid engages said aperature if said load is receiving power through said automatic transfer switch.

21. The switch assembly of claim 15, wherein: each set of separable contacts comprise first elements connected to said electrical buses assocated with both sources of power and said load, and second elements connected to and associated with said automatic transfer switch, further including: a movable shutter assembly, movably carried by said frame and interposed between said first and second elements of said separable contacts, operated in response to the location of said automatic transfer switch within said frame, said shutter assembly including an insulated shutter, defining a plurality of apertures, which is movable within said frame between an open position, where said elements of said separable contacts extend through said shutter apertures, and a closed position, where said elements are physically separated by an unbroken portion of said shutter.

22. The switch assembly of claim 21, wherein said shutter assembly includes:

a. a shutter support arm, connected to said automatic transfer switch, which moves along with and in the direction of movement of the transfer switch within said frame; and b. a linkage assembly, pivotably supported by said frame and linked to said shutter, for raising and lowering said shutter in response to the movement of said automatic transfer switch within said frame, said linkage assembly being positioned relative to said shutter support arm so that said shutter is closed when the automatic transfer switch is moved toward its isolated location, and said shutter is open when the automatic transfer switch is moved towards its engaged location so that said elements mate together through said shutter aperatures.

23. The switch assembly of claim 11, further including:

a. position sensing means for sensing the position of said transfer switch and the position of said bypass switch;

b. power sensing means for sensing the availability of both the normal and the emergency sources of power;

c. control means, operatively associated with said position sensing means and said power sensing means, for actuating the transfer switch to connect said load to an available source of power if the source of power to which the transfer switch is initially connected becomes unavailable and if the bypass switch is not connected to the available source of power;

d. a rotatable control for manually switching said bypass switch to connect either source of power to the load;

e. operation sensing means for sensing when said bypass switch is being manually operated to connect the normal source of power to the load or to connect the alterate source of power to the load;

f. fixed detection means for detecting the direction of rotation of said control; and g. automatic means, electromechanically interlocking said transfer switch and said bypass switch and operating in response to said postion sensing means, said power sensing means and said operation sensing means, for actuating said transfer switch to disconnect the load from the source of power to which said transfer switch is connecting the load if said bypass switch is manually operated to connect the other source of power to the load.

* * * * *